United States Patent
Tofte et al.

(10) Patent No.: US 10,643,285 B1
(45) Date of Patent: May 5, 2020

(54) SYSTEMS AND METHODS FOR ENVIRONMENTAL ANALYSIS BASED UPON VEHICLE SENSOR DATA

(71) Applicant: State Farm Mutual Automobile Insurance Company, Bloomington, IL (US)

(72) Inventors: Nathan Tofte, Bloomington, IL (US); Cole Nave, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 290 days.

(21) Appl. No.: 15/486,067

(22) Filed: Apr. 12, 2017

Related U.S. Application Data

(60) Provisional application No. 62/353,762, filed on Jun. 23, 2016, provisional application No. 62/363,945, filed on Jul. 19, 2016.

(51) Int. Cl.
- *G06Q 40/00* (2012.01)
- *G06Q 40/08* (2012.01)
- *G06Q 30/02* (2012.01)

(52) U.S. Cl.
CPC ......... *G06Q 40/08* (2013.01); *G06Q 30/0265* (2013.01)

(58) Field of Classification Search
CPC ..... G06G 40/00; G06G 40/08; G06G 30/0265
See application file for complete search history.

(56) References Cited

U.S. PATENT DOCUMENTS

| | | | |
|---|---|---|---|
| 6,079,738 A | 6/2000 | Lotito | |
| 6,289,160 B1 | 9/2001 | Daoud | |
| 6,393,133 B1 | 5/2002 | Breed | |
| 6,724,920 B1 | 4/2004 | Berenz | |
| 6,859,705 B2 | 2/2005 | Rao | |
| 7,058,710 B2 | 6/2006 | McCall et al. | |
| 7,604,080 B2 | 10/2009 | Breed | |
| 7,853,381 B2 | 12/2010 | Iyoda | |

(Continued)

FOREIGN PATENT DOCUMENTS

DE          10214200813 A1     7/2015

OTHER PUBLICATIONS

Leveraging in-vehicle dataMacdonald, Brad. Transport Technology Today6.2: 10(2). Babcox Media, Inc. (Feb. 2011) (Year: 2011).*

(Continued)

*Primary Examiner* — Lalita M Hamilton
(74) *Attorney, Agent, or Firm* — Armstrong Teasdale LLP

(57) ABSTRACT

A system for analyzing the environment of a vehicle i) receives a plurality of data from at least one sensor associated with a vehicle, such that the plurality of data includes at least one environmental condition at a location; (ii) analyzes the plurality of data to determine the at least one environmental condition at the location; (iii) determines a condition of a building at the location based upon the at least one environmental condition; (iv) determines an insurance product for the building based upon the determined condition associated with the building; and (v) generates an insurance quote for the insurance product. As a result, the speed and accuracy of insurance providers learning about potential clients and the conditions of the potential client's property and needs is increased.

20 Claims, 10 Drawing Sheets

(56) References Cited

U.S. PATENT DOCUMENTS

| | | |
|---|---|---|
| 8,289,160 B1 | 10/2012 | Billman |
| 8,384,534 B2 | 2/2013 | James |
| 8,686,922 B2 | 4/2014 | Breed |
| 8,880,282 B2 | 11/2014 | Gunaratne |
| 9,520,006 B1 | 12/2016 | Sankovsky et al. |
| 9,888,875 B2 | 2/2018 | Omi |
| 10,131,309 B2 | 11/2018 | Kim |
| 10,176,524 B1 | 1/2019 | Brandmaier et al. |
| 10,223,750 B1 * | 3/2019 | Loo .................. G06Q 40/08 |
| 10,223,751 B1 * | 3/2019 | Hutchinson ............ G06Q 40/08 |
| 10,262,373 B2 * | 4/2019 | Hayward ............... G06Q 40/08 |
| 2004/0139034 A1 * | 7/2004 | Farmer ............. G06Q 30/0283 705/400 |
| 2005/0179524 A1 | 8/2005 | Saito et al. |
| 2006/0168185 A1 | 7/2006 | McCall et al. |
| 2006/0267747 A1 | 11/2006 | Kondo et al. |
| 2007/0168128 A1 | 7/2007 | Tokoro et al. |
| 2008/0034030 A1 | 2/2008 | Toohey |
| 2009/0109037 A1 * | 4/2009 | Farmer ................ G06Q 20/102 340/576 |
| 2009/0265193 A1 | 10/2009 | Collins et al. |
| 2010/0049393 A1 | 2/2010 | Emam |
| 2010/0174566 A1 * | 7/2010 | Helitzer ................ G06Q 40/08 705/4 |
| 2013/0103823 A1 | 4/2013 | Dejana et al. |
| 2013/0204652 A1 | 8/2013 | Marins et al. |
| 2013/0226624 A1 | 8/2013 | Blessman et al. |
| 2013/0262369 A1 | 10/2013 | Guanwardana et al. |
| 2013/0342366 A1 | 12/2013 | Kiefer et al. |
| 2014/0132405 A1 | 5/2014 | Kiefer et al. |
| 2014/0346823 A1 | 11/2014 | Stebbins et al. |
| 2014/0358592 A1 * | 12/2014 | Wedig .................. G06Q 40/08 705/4 |
| 2015/0217689 A1 | 8/2015 | Frik et al. |
| 2015/0232065 A1 | 8/2015 | Ricci et al. |
| 2015/0242769 A1 | 8/2015 | Kezeu et al. |
| 2015/0287142 A1 | 10/2015 | Brown |
| 2016/0072891 A1 * | 3/2016 | Joshi .................. G06Q 30/0269 370/254 |
| 2016/0203586 A1 | 7/2016 | Chang et al. |
| 2017/0015312 A1 | 1/2017 | Latotzki et al. |
| 2017/0197549 A1 | 7/2017 | Vladimerou et al. |
| 2017/0225614 A1 | 8/2017 | Park et al. |
| 2017/0327069 A1 | 11/2017 | Kim |
| 2018/0178722 A1 | 6/2018 | Ohta et al. |

OTHER PUBLICATIONS

James Vincent, "Snapchat applies for patent to serve ads by recognizing objects in your snaps", http://www.theverge.com/2016/7/18/12211292/snapchat-object-recognition-advertising, Jul. 18, 2016, 6 pps.

* cited by examiner

SYSTEMS AND METHODS FOR ENVIRONMENTAL ANALYSIS BASED UPON VEHICLE SENSOR DATA

CROSS-REFERENCE TO RELATED APPLICATIONS

This application relates to U.S. Provisional Patent Application Ser. No. 62/353,762, filed Jun. 23, 2016, and U.S. Provisional Patent Application Ser. No. 62/363,945, filed Jul. 19, 2016, the contents of which are hereby incorporated by reference, in their entirety and for all purposes, herein.

FIELD OF THE INVENTION

The present disclosure relates to using vehicle sensor data for environmental analysis, and a network-based system and method for analyzing the environment of a vehicle, and determining business opportunities based upon the analysis.

BACKGROUND

In many cases, advertising is low value because there is no indication that the product or service is needed. Frequent ads on the Internet, cold calls, and door-to-door sales serve as the initial contact with hopes of a future sale, but the likelihood of completing a sale is low based upon the blind initial contact. Ads on the Internet may be triggered when an individual searches, clicks, or otherwise indicates a need.

However, there are cases, where the individual may not even know that he has a need. For instance, if a tree in an individual's front yard has insect damage, but the individual may not notice or recognize the significance. In this instance, the individual may not be aware that his property is in need of maintenance and/or who would perform that maintenance. Additionally, no Internet ads are triggered to address that need.

BRIEF SUMMARY

The present embodiments may relate to systems and methods for analyzing the environment of a vehicle. An environment monitoring system, as described herein, may include an environment monitoring ("EM") computer device that is in communication with a mobile computer device associated with a user. The EM computer device may be configured to (i) receive a plurality of data from at least one sensor associated with a vehicle, where the plurality of data includes at least one environmental condition that is proximate to the vehicle during at least one point in time and includes at least one of: a condition of a building, a condition of vegetation, a condition of a public thoroughfare, a weather condition, and a vehicular accident that the vehicle was not involved in. The plurality of data may include a plurality of location data and a plurality of sensor readings. Each sensor reading may be associated with a location of the plurality of locations. The EM computer device may be further configured to (ii) determine a location associated with the at least one environmental condition based upon the plurality of data; (iii) determine a user account associated with the determined location; (iv) determine the at least one environmental condition by comparing data associated with a plurality of separate points in time, where the environmental condition is proximate to the vehicle at the plurality of separate points in time; (v) store a plurality of historical sensor data; (vi) compare the plurality of data to the historical data to determine the at least one environmental condition; (vii) analyze the plurality of data to determine the at least one environmental condition; (viii) determine at least one actionable item based upon the at least one environmental condition; (ix) determine at least one provider based upon the actionable item; and/or (x) transmit a message to the at least one provider, such that the message includes the at least one actionable item and where the provider is configured to (a) transmit a message to the user account or (b) transmit an advertisement associated with the at least one actionable item. The EM computing device may include additional, less, or alternate functionality, including that discussed elsewhere herein.

At least one advantage of this system is that it provides more accurate leads to businesses based upon the actual needs of potential customers. This reduces the need for blind sales calls. Furthermore, the use of sensor data allows for providing additional information about changes to an environment overtime including potential actionable items, without requiring constant manual inspection. Another advantage of the system is to provide additional information about vehicular crashes to improve modeling of the scenario of the vehicular crash. Another advantage of the system is reducing potential injuries in a vehicular accident by inducing passengers to reposition and/or change direction of facing. A further advantage is reducing damage to at least one of a vehicle and/or passengers by repositioning the vehicle prior to impact.

In one aspect, a computer system for analyzing the environment of a vehicle, and/or improving the functioning of a computer, may be provided. The computer system may include at least one processor (and/or associated transceiver) in communication with at least one memory device. The at least one processor (and/or associated transceiver) may be configured or programmed to: (1) receive a plurality of data from at least one sensor associated with a vehicle, wherein the plurality of data includes at least one environmental condition; (2) analyze the plurality of data to determine the at least one environmental condition; (3) determine at least one actionable item based upon the at least one environmental condition; (4) determine at least one provider based upon the actionable item; and/or (5) transmit a message to the at least one provider or to a provide computing, such as via wireless communication or data transmission over one or more radio links or wireless communication channels, wherein the message includes the at least one actionable item to facilitate communication to providers about potential actionable items. The computer system may have additional, less, or alternate functionality, including that discussed elsewhere herein.

In another aspect, a computer-based method for analyzing the environment of a vehicle, and/or improving the functioning of a computer, may be provided. The method may be implemented on an environment monitoring ("EM") server that includes at least one processor (and/or associated transceiver) in communication with at least one memory device. The method may include: (1) receiving, at the EM server (such as via wireless communication or data transmission over one or more radio links or wireless communication channels), a plurality of data from at least one sensor (and/or transceivers) associated with a vehicle, wherein the plurality of data includes at least one environmental condition; (2) analyzing, by the EM server, the plurality of data to determine the at least one environmental condition; (3) determining, by the EM server, at least one actionable item based upon the at least one environmental condition; (4) determining, by the EM server, at least one provider based upon the actionable item; and/or (5) transmitting a message to the at least one provider or provider computing device (such as via wireless communication or data transmission over one or more radio links or wireless communication channels), wherein the message includes the at least one actionable item to facilitate communication to providers about potential actionable items. The computer system may have additional, less, or alternate functionality, including that discussed elsewhere herein.

In yet another aspect, at least one non-transitory computer-readable storage media having computer-executable instructions embodied thereon may be provided. When executed by at least one processor, the computer-executable instructions cause the processor (and/or an associated transceiver) to: (1) receive a plurality of data from at least one sensor associated with a vehicle, wherein the plurality of data includes at least one environmental condition; (2) analyze the plurality of data to determine the at least one environmental condition; (3) determine at least one actionable item based upon the at least one environmental condition; (4) determine at least one provider based upon the actionable item; and/or (5) transmit a message to the at least one provider, wherein the message includes the at least one actionable item to facilitate communication to providers about potential actionable items. The computer system may have additional, less, or alternate functionality, including that discussed elsewhere herein.

In still another aspect, a computer system for detecting a vehicular crash may be provided. The computer system may include at least one processor, sensor, and/or transceiver in communication with at least one memory device, the at least one processor, sensor, and/or transceiver. The at least one processor may be programmed to (1) (locally or remotely) receive data from the at least one sensor (such as via wired or wireless communication); (2) determine that a potential vehicular crash is imminent based upon the received data; and/or (3) perform at least one action to reduce a severity of the potential vehicular crash prior to impact. The computer system may include additional, less, or alternate functionality, including that discussed elsewhere herein.

In a different aspect, a computer-based method for detecting a vehicular crash may be provided. The method may include (1) receiving data from at least one sensor of a vehicle; (2) determining, at the EM server, that a potential vehicular crash is imminent based upon the received data; and/or (3) performing at least one action to reduce a severity of the potential vehicular crash prior to impact. The method may include additional, less, or alternate actions, including those discussed elsewhere herein.

In still another aspect, at least one non-transitory computer-readable storage media having computer-executable instructions embodied thereon may be provided. When executed by at least one processor, the computer-executable instructions cause the processor (and/or an associated transceiver) to: (1) receive data from at least one sensor of a vehicle; (2) determine that a potential vehicular crash is imminent based upon the received data; and/or (3) perform at least one action to reduce a severity of the potential vehicular crash prior to impact. The storage media may include additional, less, or alternate actions, including those discussed elsewhere herein.

In yet another aspect, a computer system for analyzing the environment of a vehicle may be provided. The computer system may include at least one processor in communication with at least one memory device. The at least one processor is programmed to receive a plurality of data from at least one sensor associated with a vehicle. The plurality of data includes at least one environmental condition. The at least one processor is also programmed to analyze the plurality of data to determine the at least one environmental condition, determine at least one actionable item based upon the at least one environmental condition, determine an insurance policy associated with the at least one actionable item, generate a virtual insurance claim based upon the at least one actionable item, and/or transmit the virtual insurance claim to an insurance provider associated with the insurance policy to facilitate proactive action on filing insurance claims. The computer system may include additional, less, or alternate actions, including those discussed elsewhere herein.

In still another aspect, a computer-based method for analyzing the environment of a vehicle may be provided. The method may be implemented on an environment monitoring ("EM") server including at least one processor in communication with at least one memory device. The method may include receiving, at the EM server, a plurality of data from at least one sensor associated with a vehicle. The plurality of data includes at least one environmental condition. The method may also include analyzing, by the EM server, the plurality of data to determine the at least one environmental condition, determining, by the EM server, at least one actionable item based upon the at least one environmental condition, determining, by the EM server, an insurance policy associated with the at least one actionable item, generating a virtual insurance claim based upon the at least one actionable item, and/or transmitting the virtual insurance claim to an insurance provider associated with the insurance policy to facilitate proactive action on filing insurance claims. The method may include additional, less, or alternate actions, including those discussed elsewhere herein.

In still another aspect, at least one non-transitory computer-readable storage media having computer-executable instructions embodied thereon may be provided. When executed by at least one processor, the computer-executable instructions cause the processor (and/or an associated transceiver) to receive a plurality of data from at least one sensor associated with a vehicle. The plurality of data includes at least one environmental condition. The computer-executable instructions may cause the processor (and/or an associated transceiver) to analyze the plurality of data to determine the at least one environmental condition, determine at least one actionable item based upon the at least one environmental condition, determine an insurance policy associated with the at least one actionable item, generate a virtual insurance claim based upon the at least one actionable item, and/or transmit the virtual insurance claim to an insurance provider associated with the insurance policy to facilitate proactive action on filing insurance claims. The storage media may include additional, less, or alternate actions, including those discussed elsewhere herein.

In yet another aspect, a computer system for analyzing the environment of a vehicle may be provided. The computer system may include at least one processor in communication with at least one memory device. The at least one processor is programmed to receive a plurality of data from at least one sensor associated with a vehicle. The plurality of data includes at least one environmental condition at a location. The at least one processor may also be programmed to analyze the plurality of data to determine the at least one environmental condition at the location, determine a condition of a building at the location based upon the at least one environmental condition, determine an insurance product for the building based upon the determined condition associated with the building, and/or generate an insurance quote for the insurance product. The computer system may include additional, less, or alternate actions, including those discussed elsewhere herein.

In still another aspect, a computer-based method for analyzing the environment of a vehicle may be provided. The method may be implemented on an environment monitoring ("EM") server including at least one processor in communication with at least one memory device. The method includes receiving, at the EM server, a plurality of data from at least one sensor associated with a vehicle. The plurality of data includes at least one environmental condition at a location. The method may also include analyzing, by the EM server, the plurality of data to determine the at least one environmental condition at the location, determining, by the EM server, a condition of a building at the location based upon the at least one environmental condition, determining, by the EM server, an insurance product for the building based upon the determined condition associated with the building, and/or generating an insurance quote for the insurance product. The method may include additional, less, or alternate actions, including those discussed elsewhere herein.

In still another aspect, at least one non-transitory computer-readable storage media having computer-executable instructions embodied thereon may be provided. When executed by at least one processor, the computer-executable instructions cause the processor (and/or an associated transceiver) to receive a plurality of data from at least one sensor associated with a vehicle. The plurality of data includes at least one environmental condition at a location. The computer-executable instructions may also cause the processor (and/or an associated transceiver) to analyze the plurality of data to determine the at least one environmental condition at the location, determine a condition of a building at the location based upon the at least one environmental condition, determine an insurance product for the building based upon the determined condition associated with the building, and/or generate an insurance quote for the insurance product. The storage media may include additional, less, or alternate actions, including those discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
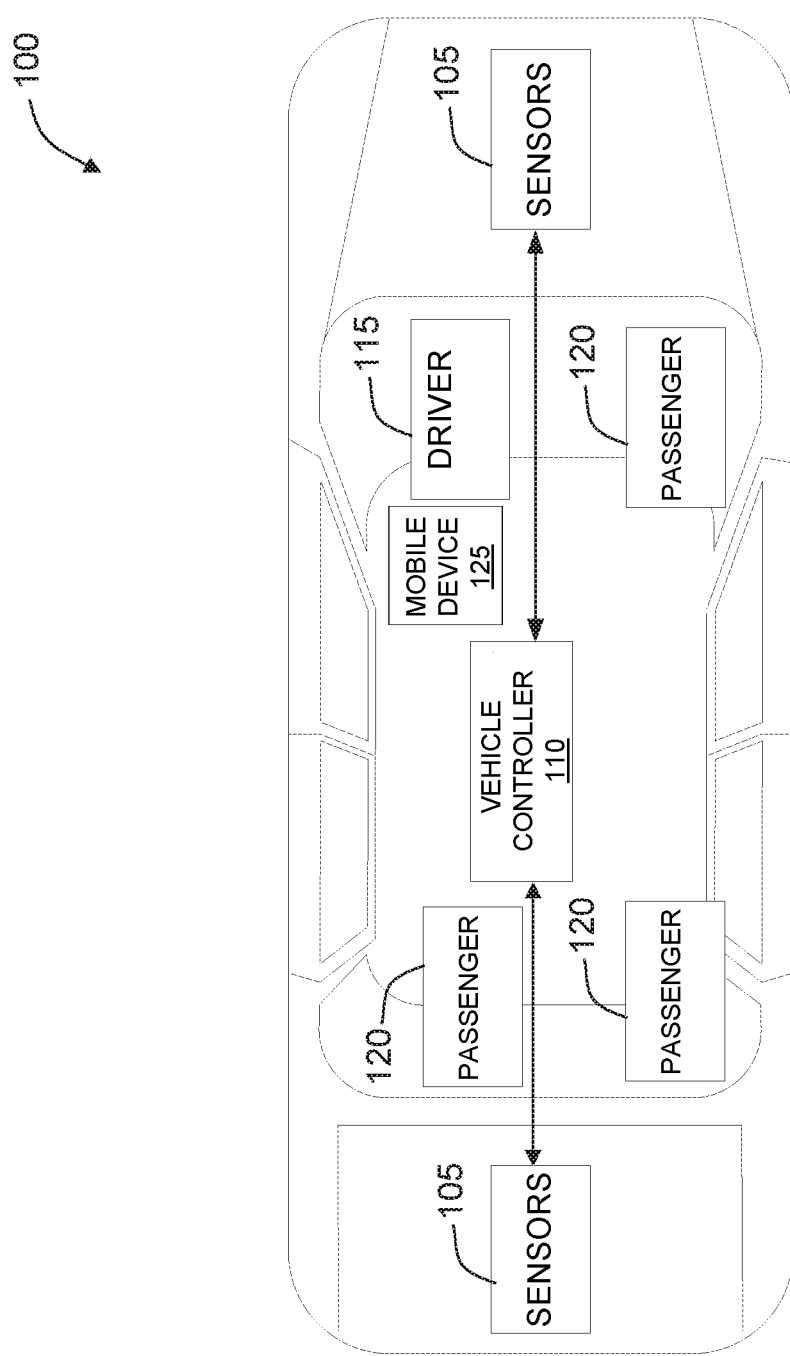
FIG. 1 illustrates a schematic diagram of an exemplary vehicle.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for analyzing the environment of a vehicle and determining at least one business opportunities based upon the environment. In an exemplary embodiment, the process is performed by an environment monitoring ("EM") computer device, also known as an environment monitoring ("EM") server.

In the exemplary embodiment, a vehicle includes a vehicle computer device and a plurality of sensors. A process begins with the vehicle computer device in-transit from one location. While in-transit, the plurality of sensors may continuously scan the environment around the vehicle. For example, the sensors may take images of buildings, plants, and other vehicles as a part of normal operation while the vehicle is in-transit. These images may be in the visible spectrum, infrared spectrum, high-contrast, and/or three-dimensional (3D) images. In the exemplary embodiment, the vehicle controller is in communication with a database and an environment monitoring ("EM") computer device, also known as an EM server. The EM server is also in communication with one or more $3^{rd}$ Party providers, such as via wireless communication or data transmission over one or more radio links or wireless communication channels. The vehicle computer device and EM server may include software that allows them to function as is described herein.

The vehicle computer device may transmit the sensor data to the database. In some embodiments, the vehicle computer device may transmit the data continuously to the database. In other embodiments, the vehicle computer device may transmit the data when the vehicle is stopped, such as at a stoplight.

In still other embodiments, the vehicle computer device may transmit the data to the database when the vehicle is connected to a network through a wired connection, such as at a recharging station. Alternatively, the vehicle may be connected to a wireless communication network through a wireless connection, such as at a wireless or other recharging station. Transmitting the data may occur at a convenient processing or data transmission time(s) based upon prioritization methods such as data transmission costs (e.g., cellular vs. free Wi-Fi) or computational costs (e.g., vehicle busy processing autonomous or accident avoidance so that may delay processing until the vehicle is parked, or until vehicle processing load has decreased.

In the exemplary embodiment, the database stores all of the data received from the sensors. In some embodiments, the database may store the raw data feeds. In other embodiments, the database may store a sub-set of the data from the sensors. In some embodiments, the database may store sensor data from a plurality of vehicles. The database stores the data that allows the EM server to function as is described herein.

In the exemplary embodiment, the EM server feeds the received sensor data through a comparative algorithm that contains historical data. In some embodiments, the EM server compares the received sensor data to historical sensor data from the same vehicle. In other embodiments, the EM server compares the sensor data to historical sensor data from other vehicles.

In the exemplary embodiment, the EM server determines if there is an actionable change in the environment of the vehicle. In a first example, sensor data may contain images of a house that the vehicle drives past. In the exemplary embodiment, sensor data may include location data, such as from a GPS unit. Based upon the location of the vehicle at the time that sensor data was taken, the EM server may determine the address of the house. The EM server may compare the received images of the house to historical images of the house. Based upon the comparison, the EM server may determine that there is damage to the house that has occurred since the last time the house was sensed. The EM server may compare the sensor data of the house to sensor data of other houses and determine a potentially hazardous or dangerous condition of the house based upon the comparison. In these examples, the EM server determines that there is an actionable change, such as repairs that need to be made to the house, or preventive or mitigating actions that should be taken.

In a second example, sensor data may contain images of a plant, such as a tree. The EM server may compare the sensor data of the tree to sensor data from other trees of the same type and determine that the tree has a disease or requires trimming to reduce various risks (such as theft or wildfire). In this example, the EM server determines that there is an actionable change, such as actions that need to be taken to improve the health of the tree. In a third example, sensor data may contain images of a public thoroughfare, such as a road or sidewalk. The EM server may determine that the public thoroughfare requires repair. In some embodiments, the EM server may determine a priority or severity of any needed repair or actionable item.

In the exemplary embodiment, if the EM server determines that there are no actionable changes, the system continues scanning and analyzing the environment of vehicle. If the EM server determines that there is an actionable change, the EM server logs the change in the database. The EM server determines a $3^{rd}$ Party to notify about the actionable change and transmits the actionable change to the $3^{rd}$ Party. The $3^{rd}$ Party may perform an action based upon the actionable item or changes. The EM server may refine one or more algorithms based upon the sensor data and the determined actionable item.

In the exemplary embodiment, the $3^{rd}$ Party may be a subscriber to a service that monitors for potential actionable items. For example, the $3^{rd}$ Party may be a landlord that owns a plurality of rental buildings. The EM server may determine that one of the landlord's buildings is in need of repairs, that one of the trees in his yard has a disease, that one of the walkways near his building has a dangerous condition, and/or that one of his tenants is failing to perform proper maintenance, e.g., mow the lawn. The notification of the actionable item may inform the landlord of a previously unknown issue that requires action on his or her part. The $3^{rd}$ Party may also be a homeowner's association and actionable items may include lawn maintenance, building changes, and other issues potentially related to the homeowner's charter.

In other examples, the $3^{rd}$ Party is a service provider, such as a tree trimmer, a roofer, or other construction company. In these examples, the $3^{rd}$ Party may transmit one or more advertisements to a person associated with the actionable item, such as the homeowner. For example, the EM server may determine that there is damage to the siding of the house, determine one or more $3^{rd}$ Parties that may repair the issue, and/or notify those $3^{rd}$ Parties.

In still other examples, the $3^{rd}$ Party may be a municipal service provider, such as a road repair crew or a building inspector. In the example of road repair crew, the actionable item may be one or more potholes or other potential hazards. In some embodiments, the hazard may be a broken water pipe and/or flooding on the road. In the example of a building inspector, the EM server may determine that a new addition or out building was added to a property and notify the building inspector that there may be a permitting issue. In another example, the EM server may compare the timing of traffic lights to determine if there is an issue, or if the timing of one or more lights may need to be adjusted.

In still further examples, the sensors may observe a vehicular accident and the EM server may use sensor data to recreate the accident and provide the accident information to the police or the appropriate insurance companies. In this example, the vehicle may not be involved in the vehicular accident.

In yet another example, the sensors may observe weather conditions. For example during a hail storm, the sensors may measure the size of hail through images and the rate of hail based upon the sound of the hail hitting the vehicle or the ground. The EM server may receive sensor data about the hail from multiple vehicles in multiple locations to determine where the hail fell and how serious it was in different areas. Then the EM server may determine one or more construction companies that would be interested in this information for lead generation purposes.

At least one of the technical problems addressed by this system may include: (i) discovering potential business opportunities; (ii) accurately monitoring conditions of one or more structures for users; (iii) improving the speed and accuracy of reconstructing a vehicular accident scenario; (iv) determining that a vehicular accident is occurring or may be occurring; and/or (v) reducing the severity of a vehicular accident.

The technical effect achieved by this system may be at least one of: (i) automated discovery of potential business opportunities; (ii) automated warning of condition changes at one or more structures; (iii) automated detection of vehicular accidents as they are occurring; and/or (iv) automatically reacting to a vehicular accident reduce the severity of the vehicular accident.

The methods and systems described herein may be implemented using computer programming or engineering techniques including computer software, firmware, hardware, or any combination or subset thereof, wherein the technical effects may be achieved by performing at least one of the following steps: (a) receiving, at an environment monitoring ("EM") server, a plurality of data from at least one sensor associated with a vehicle, where the plurality of data includes at least one environmental condition; (b) analyzing, by the EM server, the plurality of data to determine the at least one environmental condition; (c) determining, by the EM server, at least one actionable item based upon the at least one environmental condition; (d) determining, by the EM server, at least one provider based upon the actionable item; and (e) transmitting a message to the at least one provider, wherein the message includes the at least one actionable item to facilitate communication to providers about potential actionable items.

Additional technical effects may be achieved by performing at least one of the following steps: (a) receiving data from a sensor; (b) determining that a potential vehicular crash is imminent based upon the received data; and/or (c) performing at least one action to reduce a severity of the potential vehicular crash prior to impact to facilitate reducing injuries and/or damage caused by the vehicular crash.

Exemplary Vehicle

FIG. 1 depicts a view of an exemplary vehicle 100. In some embodiments, vehicle 100 may be an autonomous vehicle capable of fulfilling the transportation capabilities of a traditional automobile or other vehicle. In these embodiments, vehicle 100 may be capable of sensing its environment and navigating without human input. In other embodiments, vehicle 100 is a manual vehicle, such as a traditional automobile that is directly controlled by a driver 115.

Vehicle 100 may include a plurality of sensors 105 and a vehicle computer device 110, also known as a vehicle controller 110. The plurality of sensors 105 may detect the current surroundings and location of vehicle 100. Plurality of sensors 105 may include, but are not limited to, radar, LIDAR, Global Positioning System (GPS), video devices, imaging devices, cameras, audio recorders, and computer vision. Plurality of sensors 105 may also include sensors that detect conditions of vehicle 100, such as velocity, acceleration, gear, braking, and other conditions related to the operation of vehicle 100. In some embodiments, plurality of sensors 105 may detect the presence of driver 115 and one or more passengers 120 in vehicle 100. In these embodiments, plurality of sensors 105 may detect the presence of fastened seatbelts, the weight in each seat in vehicle 100, heat signatures, or any other method of detecting information about driver 115 and passengers 120 in vehicle 100.

Vehicle computer device 110 may interpret the sensory information to identify appropriate navigation paths, detect threats, and react to conditions. In some embodiments, vehicle computer device 110 may be able to communicate with one or more remote computer devices, such as mobile device 125. In the example embodiment, mobile device 125 is associated with driver 115 and includes one or more internal sensors, such as an accelerometer. Mobile device 125 may be capable of communicating with vehicle computer device 110 wirelessly. In addition, vehicle computer device 110 and mobile device 125 may be configured to communicate with computer devices located remotely from vehicle 100.

While vehicle 100 may be an automobile in the exemplary embodiment, in other embodiments, vehicle 100 may be, but is not limited to, other types of ground craft, aircraft, and watercraft vehicles.

Exemplary Process for Analyzing Vehicle Environment

Figure 2:
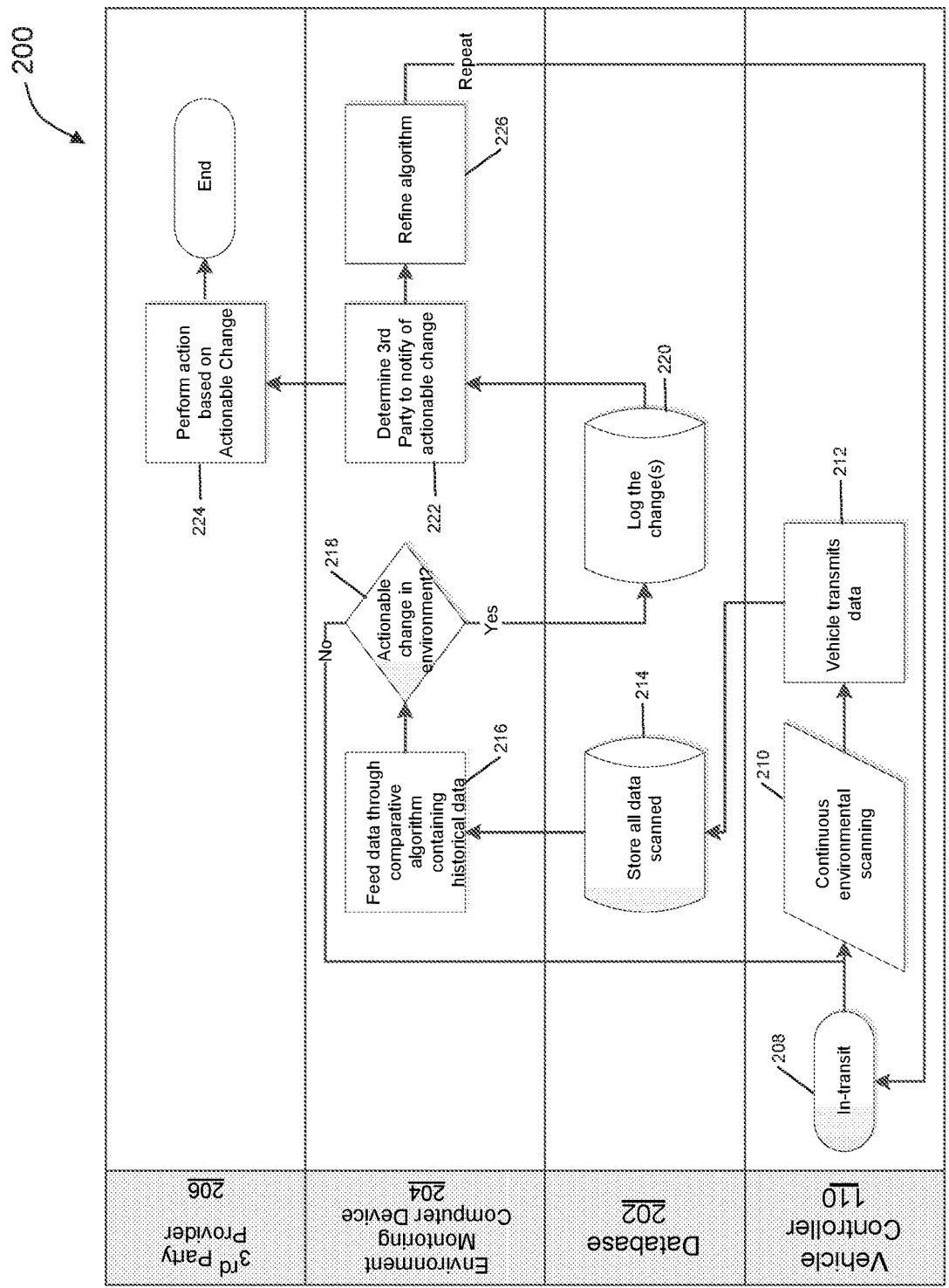
FIG. 2 illustrates a flow chart of an exemplary process of analyzing the environment of a vehicle, such as of the vehicle shown in FIG. 1.

FIG. 2 illustrates a flow chart of an exemplary process 200 of analyzing the environment of a vehicle, such as of vehicle 100 shown in FIG. 1. In the exemplary embodiment, vehicle controller 110 may be in communication with a database 202 and an environment monitoring ("EM") computer device 204, also known as an EM server 204. EM server 204 may also be in communication with one or more 3$^{rd}$ Party providers 206. Vehicle computer device 110 and EM server 204 may include software that allows them to function as is described herein.

In the exemplary embodiment, vehicle 100 (shown in FIG. 1) includes vehicle computer device 110 and a plurality of sensors 105 (shown in FIG. 1). Process 200 begins with vehicle computer device 110 in-transit 208 from one location. While in-transit 208, the plurality of sensors 105 may continually scan 210 the environment around vehicle 100. For example, sensors 105 may take images of buildings, plants, and other vehicles as a part of normal operation while vehicle 100 is in-transit. These images may be in the visible spectrum, infrared spectrum, high-contrast, and/or three-dimensional (3D) images.

Vehicle computer device 110 may transmit 212 the sensor data to database 202. In some embodiments, vehicle computer device 110 may transmit 212 the data continuously to database 202. In other embodiments, vehicle computer device 110 may transmit 212 the data when vehicle 100 is stopped, such as at a stoplight. In still other embodiments, vehicle computer device 110 may transmit 212 the data to database 202 when vehicle 100 is connected to a network through a wired connection, such as at a recharging station.

In the exemplary embodiment, database 202 stores 214 all of the data received from sensors 105. In some embodiments, database 202 may store 214 the raw data feeds. In other embodiments, database 202 may store 214 a sub-set of the data from sensors 105. In some embodiments, database 202 may store sensor data from a plurality of vehicles 100. Database 202 stores the data that allows EM server 204 to function as is described herein.

In the exemplary embodiment, EM server 204 feeds 216 the received sensor data through a comparative algorithm containing historical data. In some embodiments, EM server 204 compares the received sensor data to historical sensor data from the same vehicle 100. In other embodiments, EM server 204 compares the sensor data to historical sensor data from other vehicles.

In the exemplary embodiment, EM server 204 determines 218 if there is an actionable change in the environment of vehicle 100. In a first example, sensor data may contain images of a house that vehicle 100 drives past. In the exemplary embodiment, sensor data may include location data, such as from a GPS. Based upon the location of vehicle 100 at the time that sensor data was taken, EM server 204 may determine the address of the house. EM server 204 may compare the received images of the house to historical images of the house. Based upon the comparison, EM server 204 may determine that there is damage to the house that has occurred since the last time the house was sensed. EM server 204 may compare the sensor data of the house to sensor data of other houses and determine a potentially hazardous or dangerous condition of the house based upon the comparison. In these examples, EM server 204 determines that there is an actionable change, for example repairs that need to be made to the house.

In a second example, sensor data may contain images of a plant, such as a tree. EM server 204 may compare the sensor data of the tree to sensor data from other trees of the same type and determine that the tree has a disease or requires trimming. In this example, EM server 204 determines that there is an actionable change, such as actions that need to be taken to improve the health of the tree.

In a third example, sensor data may contain images of a public thoroughfare, such as a road or sidewalk. EM server 204 may determine that the public thoroughfare requires repair. In some embodiments, EM server 204 may determine a priority or severity of any needed repairs or actionable items.

In the exemplary embodiment, if EM server 204 determines 218 that there are no actionable changes, system 200 continues scanning and analyzing the environment of vehicle 100. If EM server 204 determines 218 that there is an actionable change, EM server 204 logs 220 the change in database 202. EM server 204 determines 222 a $3^{rd}$ Party 206 to notify about the actionable change and transmits the actionable change to the $3^{rd}$ Party 206. $3^{rd}$ Party 206 may perform 224 an action based upon the actionable item or changes. EM server 204 may refine 226 one or more algorithms based upon the sensor data and the determined actionable item.

In the exemplary embodiment, $3^{rd}$ Party 206 is a subscriber to a service that monitors for potential actionable items. For example, $3^{rd}$ Party 206 may be a landlord that owns a plurality of rental buildings. EM server 204 may determine 222 that one of the landlord's buildings is in need of repairs, that one of the trees in his yard has a disease, that one of the walkways near his building has a dangerous condition, and/or that one of his tenants is failing to perform proper maintenance, e.g., mow the lawn or perform repairs to the premises. The notification of the actionable item may inform the landlord of a previously unknown issue that requires action on his part. $3^{rd}$ Party 206 may also be a homeowner's association and actionable items may include lawn maintenance, building changes, and/or other issues potentially related to the homeowner's charter.

In other examples, $3^{rd}$ Party 206 may be a service provider, such as a tree trimmer, a roofer, or other construction company. In these examples, $3^{rd}$ Party 206 may transmit one or more advertisements to a person associated with the actionable item, such as the homeowner. For example, EM server 204 may determine 218 that there is damage to the siding of the house, determine 222 one or more $3^{rd}$ Parties 206 that may repair the issue, and notify those $3^{rd}$ Parties 206.

In still other examples, $3^{rd}$ Party 206 may be a municipal service provider, such as a road repair crew or a building inspector. In the example of road repair crew, the actionable item may be one or more potholes or other potential hazards. In some embodiments, the hazard may be a broken water pipe and/or flooding on the road. In the example of a building inspector, EM server 204 may determine 218 that a new addition or out building was added to a property and notify the building inspector that there may be a permitting issue. In another example, EM server 204 may compare the timing of traffic lights to determine if there is an issue or if the timing of one or more lights may need to be adjusted.

In still further examples, sensors 105 may observe a vehicular accident and EM server 204 may use sensor data to recreate the accident and provide the accident information to the police or the appropriate insurance companies. In this example, vehicle 100 may not be involved in the vehicular accident.

In yet another example, sensors 105 may observe weather conditions. For example during a hail storm, sensors 105 may measure the size of hail through images and the rate of hail based upon the sound of the hail hitting vehicle 100 or the ground. EM server 204 may receive sensor data about the hail from multiple vehicles 100 in multiple locations to determine where the hail fell and how serious it was in different areas. Then EM server 204 may determine 222 one or more construction companies that would be interested in this information for lead generation purposes.

In other examples, $3^{rd}$ Party 206 may be an insurance provider. The EM server 204 may analyze the vehicle sensor data, and/or other data, received, such as discussed elsewhere herein, such as using pattern recognition or machine learning techniques. The EM server 204 may determine preventive or mitigation recommendations. For instance, image data acquired via vehicle sensors may reveal shrubbery to close to an insured home, or trees with large limbs over handing a roof of the insured home. Virtual recommendations may be generated by the EM server 204, such as recommendations to trim vegetation surrounding the insured home, and transmitted to a customer's mobile device. If the customer verifies that the recommendations have been taken, then a homeowners insurance discount may be generated and applied to their insurance policy.

Additionally or alternatively, the EM server 204 may determine that (i) the shingles on a roof of an insured home should be replaced; (ii) siding should be repaired or replaced; (iii) windows or storm windows should be upgraded; (iv) doors or garage doors should be upgraded; (v) trees are infected by insects and should be treated (such as via analysis of images of leaves); (vi) observed structural insulation efficiency; etc. Recommendations may be transmitted to the customer's mobile device for their review via wireless data transmission over one or more radio links or wireless communication channels. If the customer performs the suggested upgrade(s) to their home, an insurance discount may be generated and applied to their policy.

After insurance-related event, such as one that causes damage to an insured vehicle or an insured home, vehicle sensor data and/or other data may be analyzed to estimate an extent of damage to the insured vehicle or home, respectively. A virtual proposed insurance claim may be generated using the damage estimate, and transmitted to the customer's mobile device for their review and/or approval. In case of a vehicle collision, if damage is severe, the insured vehicle may be deemed a "total loss" for insurance purposes and the total loss claim handling process may commence. In the case that a current insurance-related event, such as a home fire or vehicle collision, is anticipated or has happened, emergency personnel may be requested to arrive at the scene to render aid.

Exemplary Method for Analyzing Vehicle Environment

Figure 3:
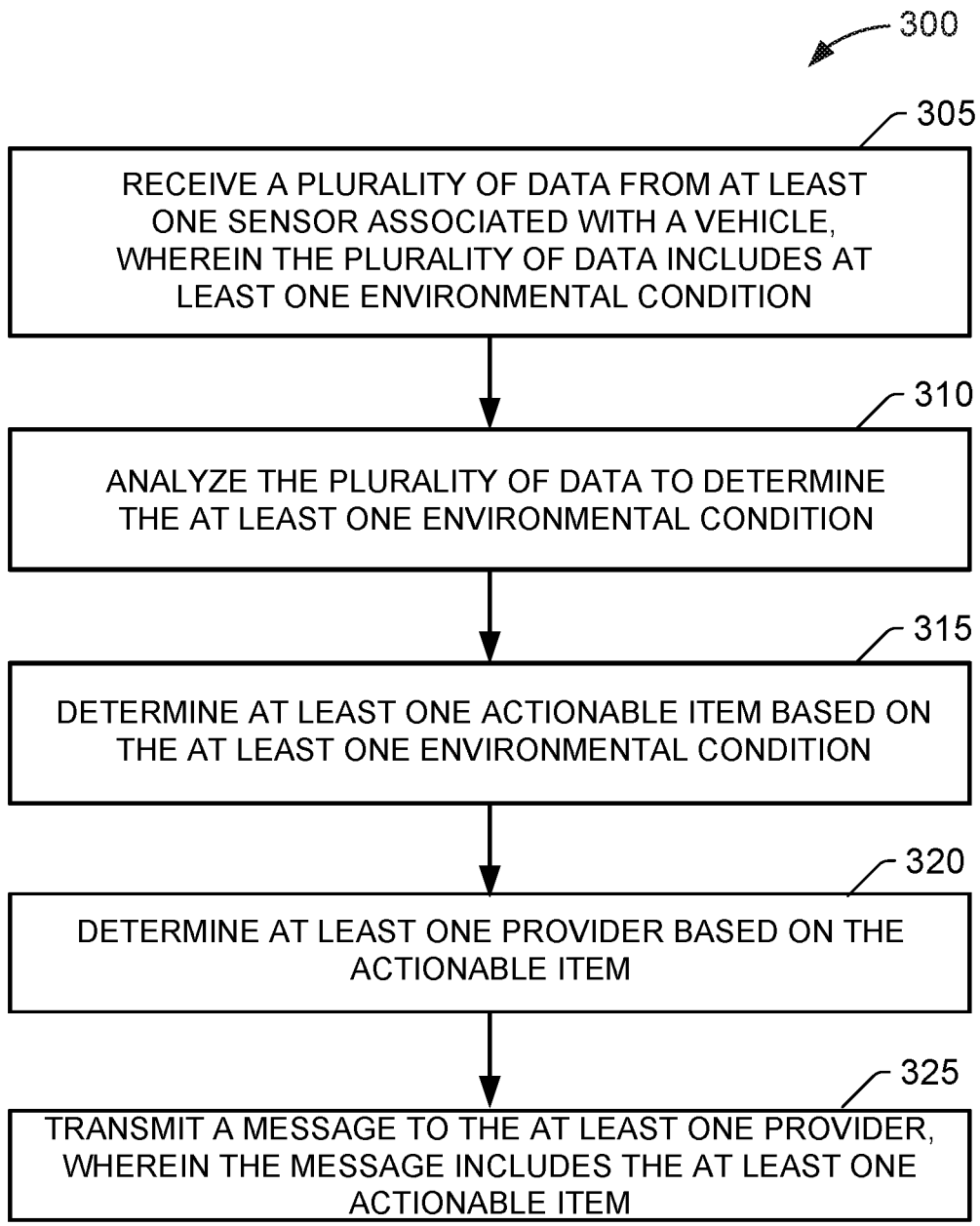
FIG. 3 illustrates a flow chart of an exemplary computer-implemented process for analyzing the environment of a vehicle shown in FIG. 2.

FIG. 3 illustrates a flow chart of an exemplary computer-implemented process 300 for analyzing the environment of a vehicle as shown in FIG. 2. Process 300 may be implemented by a computing device, for example EM server 204 (shown in FIG. 2). In the exemplary embodiment, EM server 204 may be in communication with vehicle computer device 110 (shown in FIG. 1) through a wireless communications network, such as a cellular network. In some embodiments, database 202 (shown in FIG. 2) and EM server 204 are both part of vehicle computer device 110 and included in vehicle 100 (shown in FIG. 1).

In the exemplary embodiment, EM server 204 may receive 305 a plurality of data from at least one sensor 105 (shown in FIG. 1) associated with vehicle 100. In the exemplary embodiment, the plurality of data may include at least one environmental condition. Examples of an environmental condition include, but are not limited to, a condition of a building, a condition of vegetation, a condition of a public thoroughfare, a weather condition, and a vehicular accident that vehicle 100 was not involved in. Other examples of environmental conditions are listed above. In the exemplary embodiment, vehicle 100 includes a plurality of sensors 105 that provide data to vehicle controller 110. Vehicle controller 110 transmits the sensor data to EM server 204 for analysis.

In the exemplary embodiment, EM server 204 may analyze 310 the plurality of data to determine the at least one environmental condition. In some embodiments, EM server 204 may compare the received plurality of data to historical sensor data to determine the environmental condition. In other embodiments, EM server 204 may use algorithms of potential issues and known examples of environmental conditions to determine if one of the known examples is in the received sensor data.

In the exemplary embodiment, EM server 204 may determine 315 at least one actionable item based upon the determined at least one environmental condition. EM server 204 may determine 320 at least one provider or $3^{rd}$ Party 206 (shown in FIG. 3) based upon the actionable item. In some embodiments, the $3^{rd}$ Party 206 is a user, who set up a user account to receive information about the determined environmental condition or actionable items. Examples of $3^{rd}$ Parties 206 may include municipal agencies, landlords, and advertisers. For example, EM server 204 may determine 320 a landlord for the actionable item based upon the location of vehicle 100 at the time that the sensor data was taken. Using the GPS location information, EM server 204 may determine the address of the building being imaged and determine the landlord for that building, who has set-up an account to receive notifications.

In the scenario where the $3^{rd}$ Party 206 is an insurance provider, the actionable item may be to generate a quote and/or a discount for homeowners or auto insurance based upon EM server 204 analysis of the vehicle sensor data collected. For instance, home features and status of a home or vehicle may be determined from processor analysis (such as performing pattern recognition or machine learning techniques on image data), and risk, or lack thereof, may be assessed or estimated by the processor.

Additionally or alternatively, after an insurance-related event, such as a tornado or wind storm for an insured home or a vehicle collision for an insured vehicle, the amount and/or level of severity of damage to the insured asset may be estimated from the sensor data received. For instance, a vehicle with extensive damage of a high percentage of pre-collision vehicle value may be deemed a total loss for insurance purposes.

Referring back to FIG. 3, EM server 204 may then transmit 325 a message to the determined $3^{rd}$ Party provider 206. The message may include the actionable item, the environmental condition, sensor data, and/or any other information required and/or requested by the $3^{rd}$ Party. In some embodiments, EM server 204 may collect sensor data from a plurality of vehicles 100 and use that sensor data to determine 315 a plurality of actionable items. In these embodiments, EM server 204 may transmit a batch message to $3^{rd}$ Party 206 with actionable items associated with $3^{rd}$ Party's interests.

Exemplary Computer Network

Figure 4:
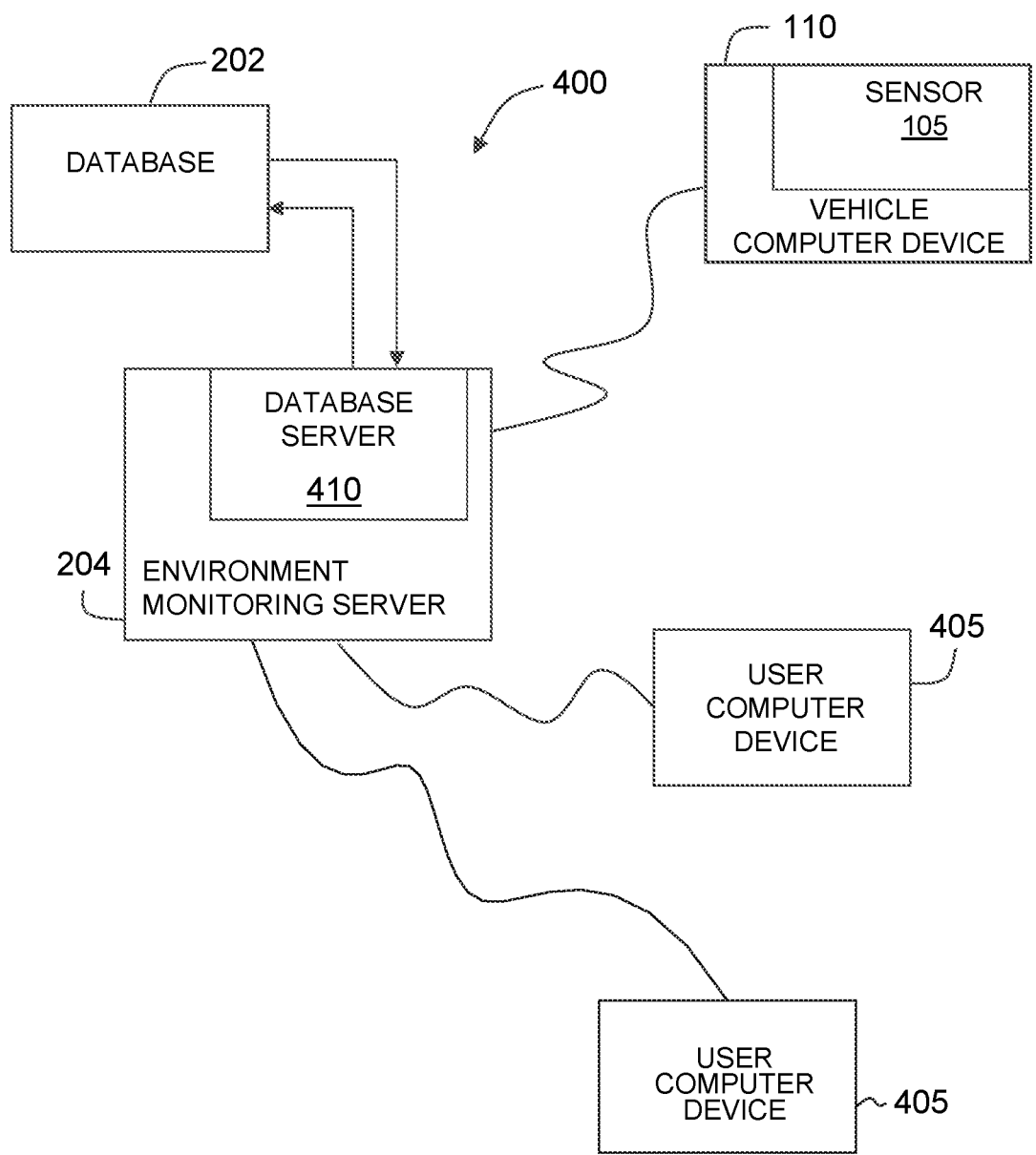
FIG. 4 illustrates a simplified block diagram of an exemplary computer system for implementing the process shown in FIG. 1.

FIG. 4 depicts a simplified block diagram of an exemplary system 400 for implementing process 200 shown in FIG. 2. In the exemplary embodiment, system 400 may be used for analyzing the environment of a vehicle based upon sensor data, determining one or more actionable items based upon the environment, and communicating with providers to perform those actionable items. As described below in more detail, environment monitoring ("EM") server 204 may be configured to receive a plurality of data from at least one sensor 105 associated with vehicle 100 (both shown in FIG. 1). The plurality of data includes at least one environmental condition. EM server 204 may also be configured to analyze the plurality of data to determine the at least one environmental condition, determine at least one actionable item based upon the at least one environmental condition, determine at least one provider 206 (shown in FIG. 2) based upon the actionable item, and transmit a message to the at least one provider 206. The message includes the at least one actionable item to facilitate communication to providers about potential actionable items.

In the exemplary embodiment, user computer devices 405 are computers that include a web browser or a software application, which enables user computer devices 405 to access EM server 204 using the Internet or other network. More specifically, user computer devices 405 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computer devices 405 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In some embodiments, user computer device 405 is associated with the policyholder of an account associated with vehicle 100. In other embodiments, user computer device 405 is associated with a third party, such as $3^{rd}$ Party Provider 206.

A database server 410 may be communicatively coupled to a database 202 that stores data. In one embodiment, database 202 may include $3^{rd}$ Party providers, sensor data, historical data, environmental conditions, and/or actionable items. In the exemplary embodiment, database 202 may be stored remotely from EM server 204. In some embodiments, database 202 may be decentralized. In the exemplary embodiment, a user may access database 202 via user computer devices 405 by logging onto EM server 204, as described herein.

EM server 204 may be communicatively coupled with the user computer devices 405. In some embodiments, EM server 204 may be associated with, or is part of a computer network associated with a manufacturer of vehicle 100, or in communication with the manufacturer's computer network (not shown). In other embodiments, EM server 204 may be associated with a third party. In some embodiments, vehicle controller 110 may include EM server 204. In other embodiments, EM server 204 may be remote from vehicle computer device 110 and may communicate with vehicle computer device 110 via a wireless connection, such as a cellular connection. In some embodiments, EM server 204 may be associated with, or is part of a computer network associated with an insurance provider, or in communication with the insurance provider's computer network (not shown). In other embodiments, EM server 204 may be associated with a third party and is merely in communication with the insurance provider's computer network.

One or more vehicle computer devices 110 may be communicatively coupled with EM server 204 through the Internet or a cellular network. In the exemplary embodiment, vehicle computer devices 110 are computers included in vehicles 100 that include a software application, which enables vehicle computer devices 110 to access EM server 204 using the Internet or other network. More specifically, vehicle computer devices 110 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. In some embodiments, vehicle computer device 110 may be capable of communicating with EM server 204 while in transit. In other embodiments, vehicle computer device 110 may be capable of communicating with EM server 204 while vehicle 100 is at rest, such as at a stoplight. In still other embodiments, vehicle computer device 110 may be capable of communicating with EM server 204 while vehicle 100 is parked, such as at a recharging station (not shown).

Vehicle computer device 110 may also include one or more sensors 105. Vehicle computer device 110 may be configured to receive data from sensors 105 and transmit sensor data to EM server 204.

In the exemplary embodiment, sensor 105 may be a configured to detect one or more conditions of the environment around vehicle 100. In other embodiments, sensor 105 may be configured to detect one or more conditions of one or more occupants of vehicle 100, such as driver 115 and/or passengers 120 (both shown in FIG. 1).

Exemplary Client Device

Figure 5:
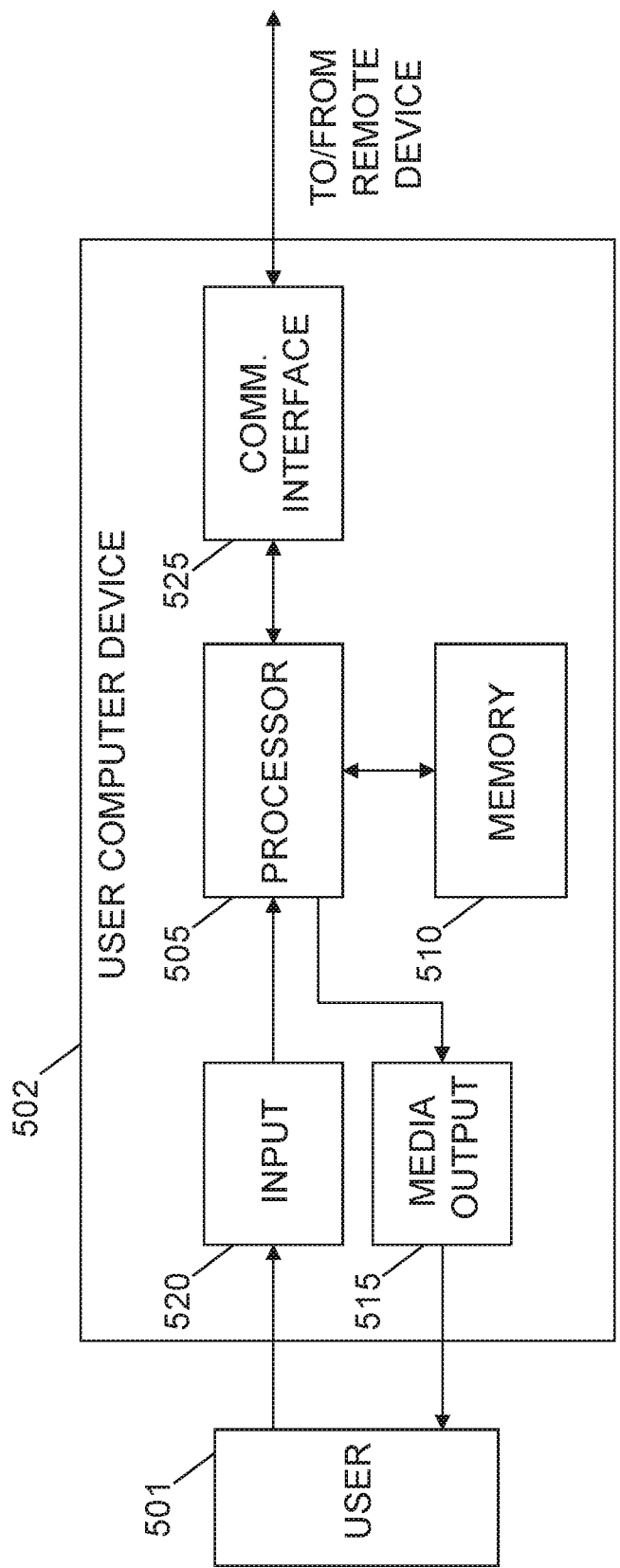
FIG. 5 illustrates an exemplary configuration of a client computer device shown in FIG. 4, in accordance with one embodiment of the present disclosure.

FIG. 5 depicts an exemplary configuration of user computer device 405 shown in FIG. 4, in accordance with one embodiment of the present disclosure. User computer device 502 may be operated by a user 501. User computer device 502 may include, but is not limited to, user computer devices 405 (shown in FIG. 4), vehicle controller 110 (shown in FIG. 1), and mobile device 125 (shown in FIG. 1). User computer device 502 may include a processor 505 for executing instructions. In some embodiments, executable instructions are stored in a memory area 510. Processor 505 may include one or more processing units (e.g., in a multi-core configuration). Memory area 510 may be any device allowing information such as executable instructions and/or transaction data to be stored and retrieved. Memory area 510 may include one or more computer readable media.

User computer device 502 may also include at least one media output component 515 for presenting information to user 501. Media output component 515 may be any component capable of conveying information to user 501. In some embodiments, media output component 515 may include an output adapter (not shown) such as a video adapter and/or an audio adapter. An output adapter may be operatively coupled to processor 505 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 515 may be configured to present a graphical user interface (e.g., a web browser and/or a client application) to user 501. A graphical user interface may include, for example, an online store interface for viewing and/or purchasing items, and/or a wallet application for managing payment information. In some embodiments, user computer device 502 may include an input device 520 for receiving input from user 501. User 501 may use input device 520 to, without limitation, select and/or enter one or more items to purchase and/or a purchase request, or to access credential information, and/or payment information.

Input device 520 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 515 and input device 520.

User computer device 502 may also include a communication interface 525, communicatively coupled to a remote device such as EM server 204 (shown in FIG. 2). Communication interface 525 may include, for example, a wired or wireless network adapter and/or a wireless data transceiver for use with a mobile telecommunications network.

Stored in memory area 510 are, for example, computer readable instructions for providing a user interface to user 501 via media output component 515 and, optionally, receiving and processing input from input device 520. A user interface may include, among other possibilities, a web browser and/or a client application. Web browsers enable users, such as user 501, to display and interact with media and other information typically embedded on a web page or a website from EM server 204. A client application allows user 501 to interact with, for example, EM server 204. For example, instructions may be stored by a cloud service, and the output of the execution of the instructions sent to the media output component 515.

Figure 7:
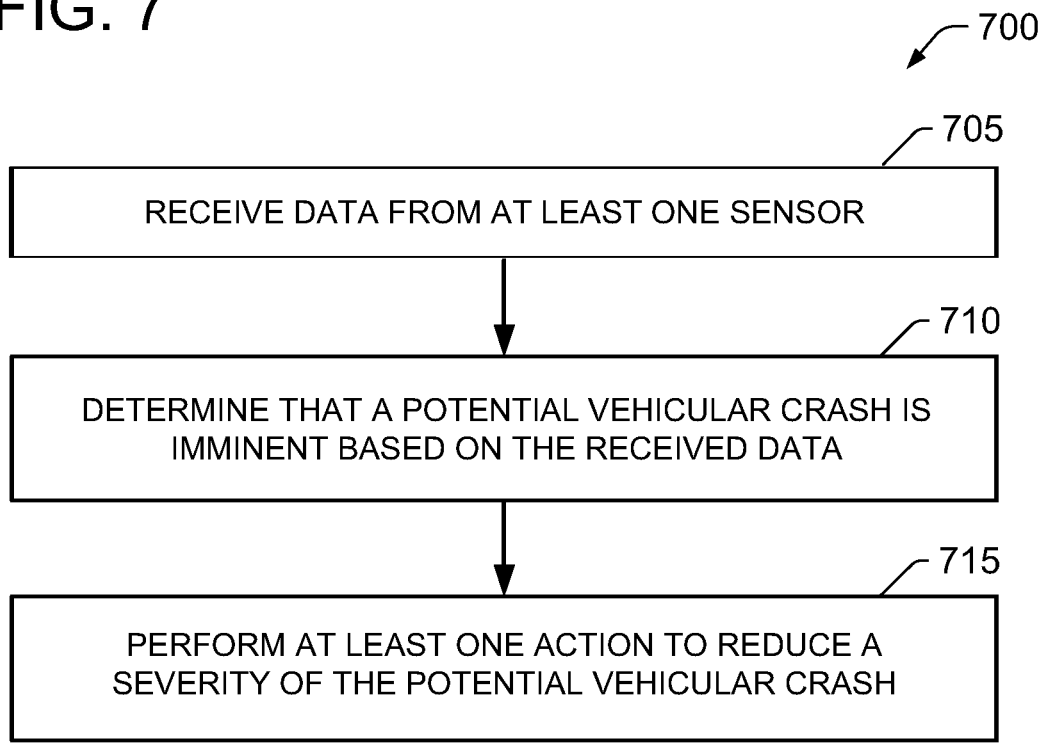
FIG. 7 illustrates a flow chart of an exemplary computer-implemented process of detecting a vehicular crash using the system shown in FIG. 4.

Processor 505 executes computer-executable instructions for implementing aspects of the disclosure. In some embodiments, the processor 505 is transformed into a special purpose microprocessor by executing computer-executable instructions or by otherwise being programmed. For example, the processor 505 may be programmed with the instruction such as illustrated in FIG. 7.

In some embodiments, user computer device 502 may include, or be in communication with, one or more sensors, such as sensor 105 (shown in FIG. 1). User computer device 502 may be configured to receive data from the one or more sensors and store the received data in memory area 510. Furthermore, user computer device 502 may be configured to transmit the sensor data to a remote computer device, such as EM server 204, through communication interface 525.

Exemplary Server Device

Figure 6:
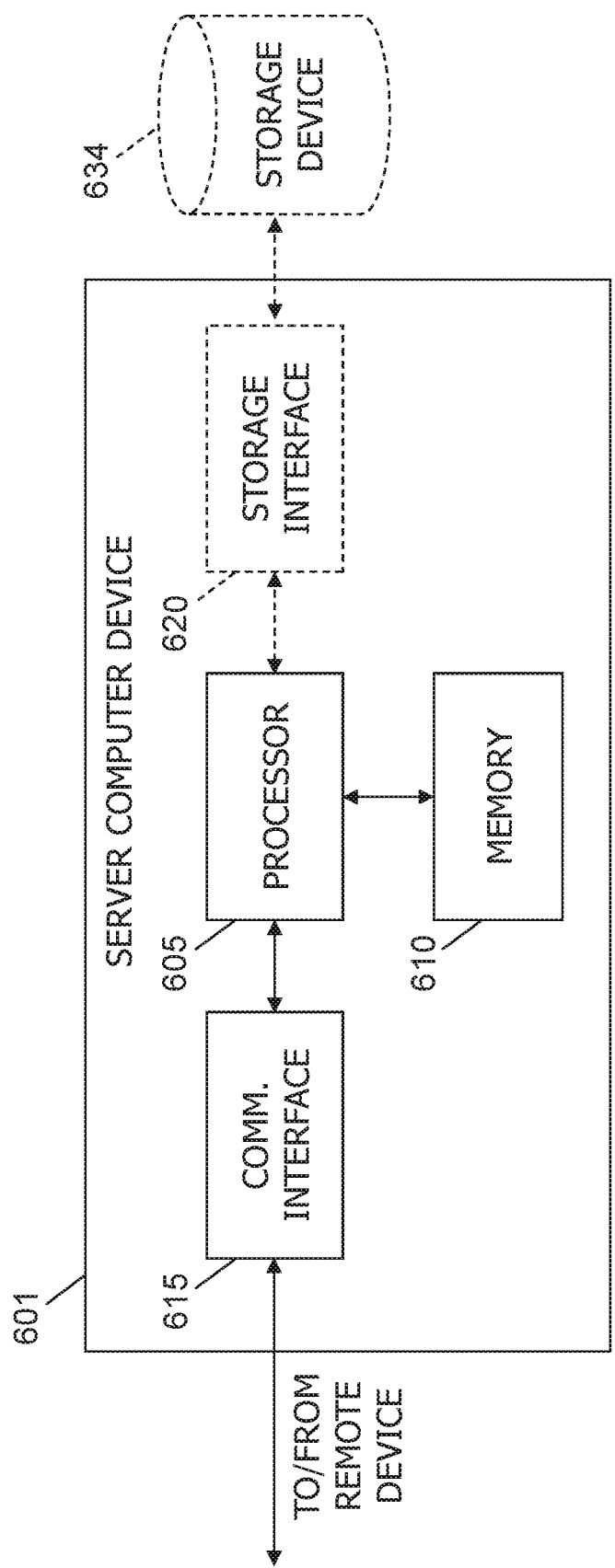
FIG. 6 illustrates an exemplary configuration of a server shown in FIG. 4, in accordance with one embodiment of the present disclosure.

FIG. 6 depicts an exemplary configuration of server 204 shown in FIG. 4, in accordance with one embodiment of the present disclosure. Server computer device 601 may include, but is not limited to, database server 410 (shown in FIG. 4), EM server 204 (shown in FIG. 2), and vehicle controller 110 (shown in FIG. 1). Server computer device 601 may also include a processor 605 for executing instructions. Instructions may be stored in a memory area 610. Processor 605 may include one or more processing units (e.g., in a multi-core configuration).

Processor 605 may be operatively coupled to a communication interface 615 such that server computer device 601 is capable of communicating with a remote device such as another server computer device 601, mobile device 125 (shown in FIG. 1), vehicle computer device 110 (shown in FIG. 1), user computer device 405 (shown in FIG. 4), and EM server 204. For example, communication interface 615 may receive requests from user computer devices 405 via the Internet, as illustrated in FIG. 4.

Processor 605 may also be operatively coupled to a storage device 634. Storage device 634 may be any computer-operated hardware suitable for storing and/or retrieving data, such as, but not limited to, data associated with database 202 (shown in FIG. 2). In some embodiments, storage device 634 may be integrated in server computer device 601. For example, server computer device 601 may include one or more hard disk drives as storage device 634.

In other embodiments, storage device 634 may be external to server computer device 601 and may be accessed by a plurality of server computer devices 601. For example, storage device 634 may include a storage area network (SAN), a network attached storage (NAS) system, and/or multiple storage units such as hard disks and/or solid state disks in a redundant array of inexpensive disks (RAID) configuration.

In some embodiments, processor 605 may be operatively coupled to storage device 634 via a storage interface 620. Storage interface 620 may be any component capable of providing processor 605 with access to storage device 634. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 634.

Processor 605 may execute computer-executable instructions for implementing aspects of the disclosure. In some embodiments, the processor 605 may be transformed into a special purpose microprocessor by executing computer-executable instructions or by otherwise being programmed. For example, the processor 605 may be programmed with the instruction such as illustrated in FIG. 3.

Exemplary Vehicular Crash Detection

FIG. 7 illustrates a flow chart of an exemplary computer-implemented process 700 for detecting a vehicular crash using system 400 shown in FIG. 4. Process 700 may be implemented by a computing device, for example vehicle computer device 110 (shown in FIG. 4). In some embodiments, process 700 may be implemented by EM server 204 (shown in FIG. 2). In the exemplary embodiment, vehicle computer device 110 may be in communication with EM server 204.

In the exemplary embodiment, vehicle computer device 110 receives 705 data from at least one sensor 105 (shown in FIG. 1). In the exemplary embodiment, at least one sensor 105 may be one or more of plurality of sensors 105 (shown in FIG. 1) in vehicle 100.

Vehicle computer device 110 determines 710 that a potential vehicular crash is imminent based upon the received sensor data. For example, in the exemplary embodiment, sensor 105 is an external sensor and may show that another vehicle is about to collide with vehicle 100. Or sensor 105 may be an impact sensor or any other sensor that allows vehicle computer device 110 to work as described herein.

In some embodiments, vehicle computer device 110 generates a scenario model of the potential vehicular crash based upon the received sensor data. Scenario models may predict damage to vehicle 100 and injuries that may be experiences by driver 115 and passengers 120 (both shown in FIG. 1) of vehicle 100. In the exemplary embodiment, vehicle computer device 110 accesses a database, such as database 202 (shown in FIG. 2). Database 202 may contain a plurality of crash scenarios and the sensor data associated with these crash scenarios. The scenarios may be based upon information from vehicle crash testing facilities, from past crashes that EM server 204 has analyzed, and/or from other sources that allow vehicle computer device 110 to operate as described here. Vehicle computer device 110 compares the received sensor data with the different stored crash scenarios to generate a scenario model that is the most likely match for the imminent vehicular crash. In some further embodiments, vehicle computer device 110 may communicate the sensor data to EM server 204, where EM server 204 may generate the scenario model.

In some embodiments, vehicle computer device 110 generates a plurality of scenario models that may fit the sensor data received. Vehicle computer device 110 may then rank the generated scenarios based upon the likelihood or degree of certainty that the scenario is correct. In some further embodiments, vehicle computer device 110 may compare the degree of certainty to a predetermined threshold.

In the exemplary embodiment, vehicle computer device 110 performs 715 at least one action to reduce the severity of the potential vehicular crash prior to impact. In some embodiments, the action that vehicle computer device 110 performs 715 may be to adjust the position or situation of vehicle 100 at the point of impact. In these embodiments, vehicle computer device 110 may determine a position of vehicle 100 to reduce damage to at least one of one or more occupants of the vehicle and the vehicle based upon the scenario model. Vehicle computer device 110 may instruct vehicle 100 to adjust its position to the determined position to lessen the impact. For example, vehicle computer device 110 may instruct vehicle 100 to turn one or more wheels to readjust vehicle's position. In other examples, vehicle 100 may include hydraulics or some other component that allows vehicle 100 to raise or lower portions of itself.

In these examples, vehicle computer device 110 may instruct vehicle 100 to raise or lower a portion of itself to redirect how forces may impact the vehicle during impact. In some further examples, vehicle 100 may have one or more inflatable external components that vehicle computer device 110 may be able to instruct vehicle 100 to inflate prior to impact to cause forces in the impact to be redirected.

In another embodiment, vehicle computer device 110 may receive data from sensors 105 about driver 115 and passengers 120 of vehicle 100. In this embodiment, vehicle computer device 110 may be able to use that sensor data to determine a position and a direction of facing of at least one occupant of the vehicle. Then using the scenario model, vehicle computer device 110 may be able to determine an advantageous direction of facing for the at least one occupant. Vehicle computer device 110 may then generate a sound through the audio system of vehicle 100, such a horn or alarm sound. The sound would be generated to cause the at least one occupant to change to the advantageous direction of facing. For example, vehicle computer device 110 may generate a honking sound to cause the passenger to turn around to prevent or reduce potential injuries during the imminent vehicular crash.

Exemplary Computer Device

Figure 8:
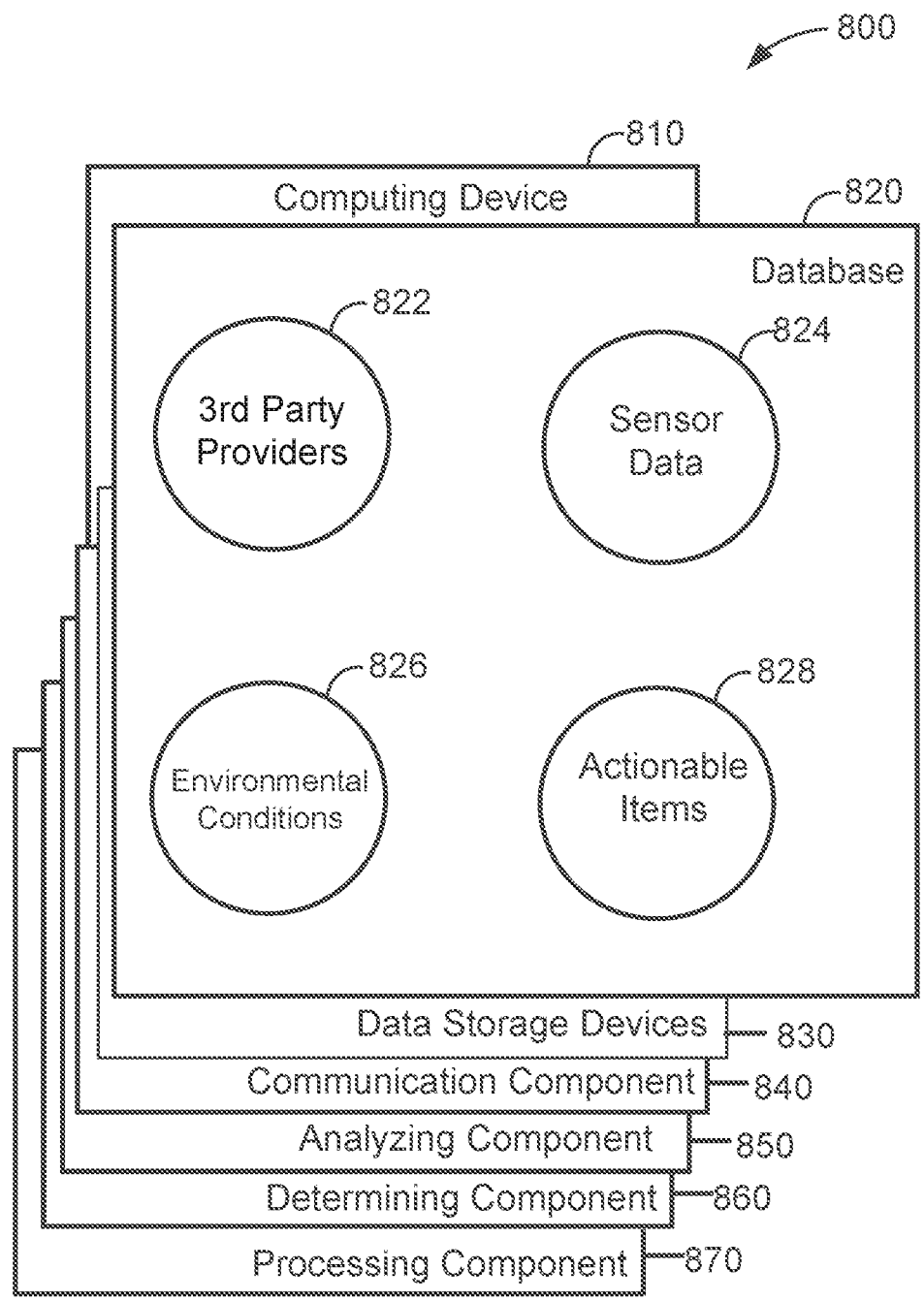
FIG. 8 illustrates a diagram of components of one or more exemplary computing devices that may be used in the system shown in FIG. 4.

FIG. 8 depicts a diagram 800 of components of one or more exemplary computing devices 810 that may be used in system 400 shown in FIG. 4. In some embodiments, computing device 810 may be similar to EM server 204 (shown in FIG. 2). Database 820 may be coupled with several separate components within computing device 810, which perform specific tasks. In this embodiment, database 820 may include $3^{rd}$ Party providers 822, sensor data 824, environmental conditions 826, and/or actionable items 828. In some embodiments, database 820 is similar to database 202 (shown in FIG. 2).

Computing device 810 may include the database 820, as well as data storage devices 830. Computing device 810 may also include a communication component 840 for receiving 305 a plurality of data and transmitting 325 a message (both shown in FIG. 3), such as via wireless communication or data transmission via radio links or wireless communication channels. Computing device 810 may further include an analyzing component 850 for analyzing 310 the plurality of data (shown in FIG. 3). Moreover, computing device 810 may include a determining component 860 for determining 315 at least one actionable item and determining 320 at least one provider (both shown in FIG. 3). A processing component 870 may assist with execution of computer-executable instructions associated with the system.

Exemplary Vehicle Environment Analysis

Figure 9:
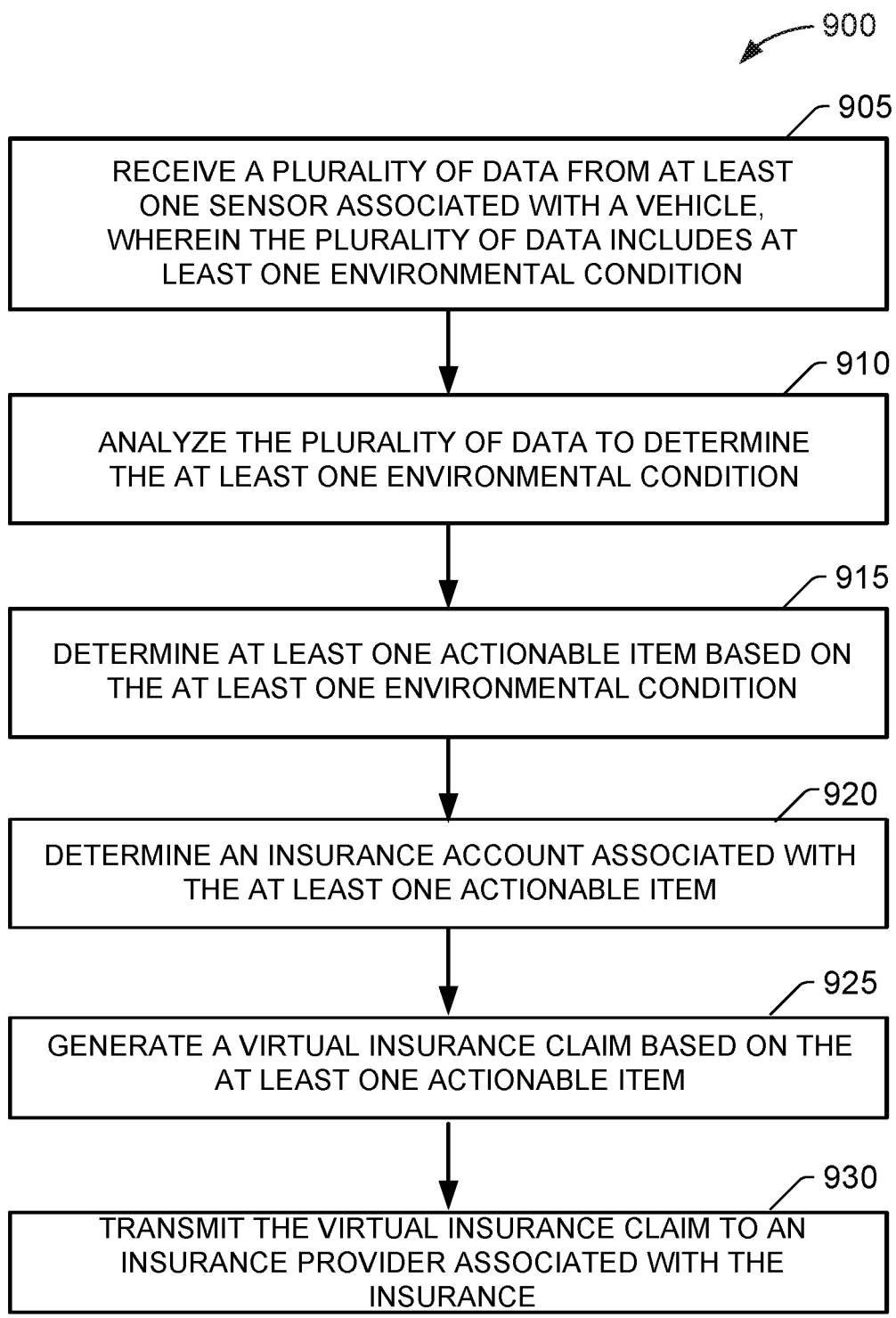
FIG. 9 illustrates a flow chart of another exemplary computer-implemented process for analyzing the environment of a vehicle shown in FIG. 2.

FIG. 9 illustrates a flow chart of another exemplary computer-implemented process for analyzing the environment of a vehicle shown in FIG. 2. Process 900 may be implemented by a computing device, for example EM server 204 (shown in FIG. 2). In the exemplary embodiment, EM server 204 may be in communication with vehicle computer device 110 (shown in FIG. 1) through a wireless communications network, such as a cellular network, and/or over one or more radio links or wireless communication channels. In some embodiments, database 202 (shown in FIG. 2) and EM server 204 are both part of vehicle computer device 110 and included in vehicle 100 (shown in FIG. 1).

In the exemplary embodiment, EM server 204 may receive 905 a plurality of data from at least one sensor 105 (shown in FIG. 1) associated with vehicle 100. In the exemplary embodiment, the plurality of data may include at least one environmental condition. Examples of an environmental condition include, but are not limited to, a condition of a building, a condition of vegetation, a condition of a public thoroughfare, a weather condition, and a vehicular accident that vehicle 100 was not involved in. Other examples of environmental conditions are listed above. In the exemplary embodiment, vehicle 100 includes a plurality of sensors 105 that provide data to vehicle controller 110. Vehicle controller 110 transmits the sensor data to EM server 204 for analysis.

In the exemplary embodiment, EM server 204 may analyze 910 the plurality of data to determine the at least one environmental condition. In some embodiments, EM server 204 may compare the received plurality of data to historical sensor data to determine the environmental condition. In other embodiments, EM server 204 may use algorithms of potential issues and known examples of environmental conditions to determine if one of the known examples is in the received sensor data.

In the exemplary embodiment, EM server 204 may determine 915 at least one actionable item based upon the determined at least one environmental condition. EM server 204 may determine 920 an insurance policy associated with the at least one actionable item. For example, EM server 204 may determine 920 an associated insurance policy by determining an address associated with the at least one actionable item. Using the GPS location information, EM server 204 may determine the address of the building being imaged. EM server 204 may then look up the address in database 202 to determine 920 if there is an insurance policy associated with that address.

EM server 204 may then generate 925 a proposed virtual insurance claim based upon the at least one actionable item. For example, the environmental condition may be damage to the siding of a house and the actionable item be the needed repairs. The house may be insured and EM server 204 may generate a proposed virtual claim for the damage based upon the insurance policy and the needed repairs.

In some embodiments, EM server 204 may determine a cost and/or value of the virtual claim based upon the actionable item. In some further embodiments, EM server 204 may determine one or more recommended $3^{rd}$ Party providers 206 to rectify the actionable items. In some further embodiments, EM server 204 may request bids from 3rd Party Providers 206 to determine the costs and/or values of actionable items.

In still further embodiments, EM server 204 may generate 925 a plurality of potential virtual claims based upon the actionable items. EM server 204 may then rank the plurality of potential claims to determine which ones are the most appropriate for the actionable items before generating. EM server 204 may use other methods to determine the most appropriate virtual claims to generate.

EM server 204 may present the proposed virtual insurance claim to the customer for their review and/or approval. For instance, the EM server 204 may transmit the proposed virtual insurance claim to the customer's mobile device or vehicle display, such as via wireless communication or data transmission over one or more radio frequency links or wireless communication channels. After which, the customer may approve the proposed virtual insurance claim, such as by pressing an icon of their mobile device or vehicle display. The approval may then be transmitted via wireless communication or data transmission back to the EM server 204.

After which, EM server 204 may transmit 930 the virtual insurance claims to an insurance provider, such as the one associated with the insurance policy. The insurance provider may then complete the virtual claim and/or determine other claims for the insurance policy based upon the actionable items and environmental conditions.

Additionally or alternatively, after an insurance-related event, such as a tornado or wind storm for an insured home or a vehicle collision for an insured vehicle, the amount and/or level of severity of damage to the insured asset may be estimated from the sensor data received. For instance, a vehicle with extensive damage of a high percentage of pre-collision vehicle value may be deemed a total loss for insurance purposes. Referring back to FIG. 9, EM server 204 may then generate 925 and transmit 930 one or more virtual claims to the insurance provider. The virtual claims may include the actionable item, the environmental condition, sensor data, and/or any other information required and/or requested by the insurance provider. In some embodiments, EM server 204 may collect sensor data from a plurality of vehicles 100 and use that sensor data to determine 915 a plurality of actionable items.

Exemplary Method for Analyzing Vehicle Environment

Figure 10:
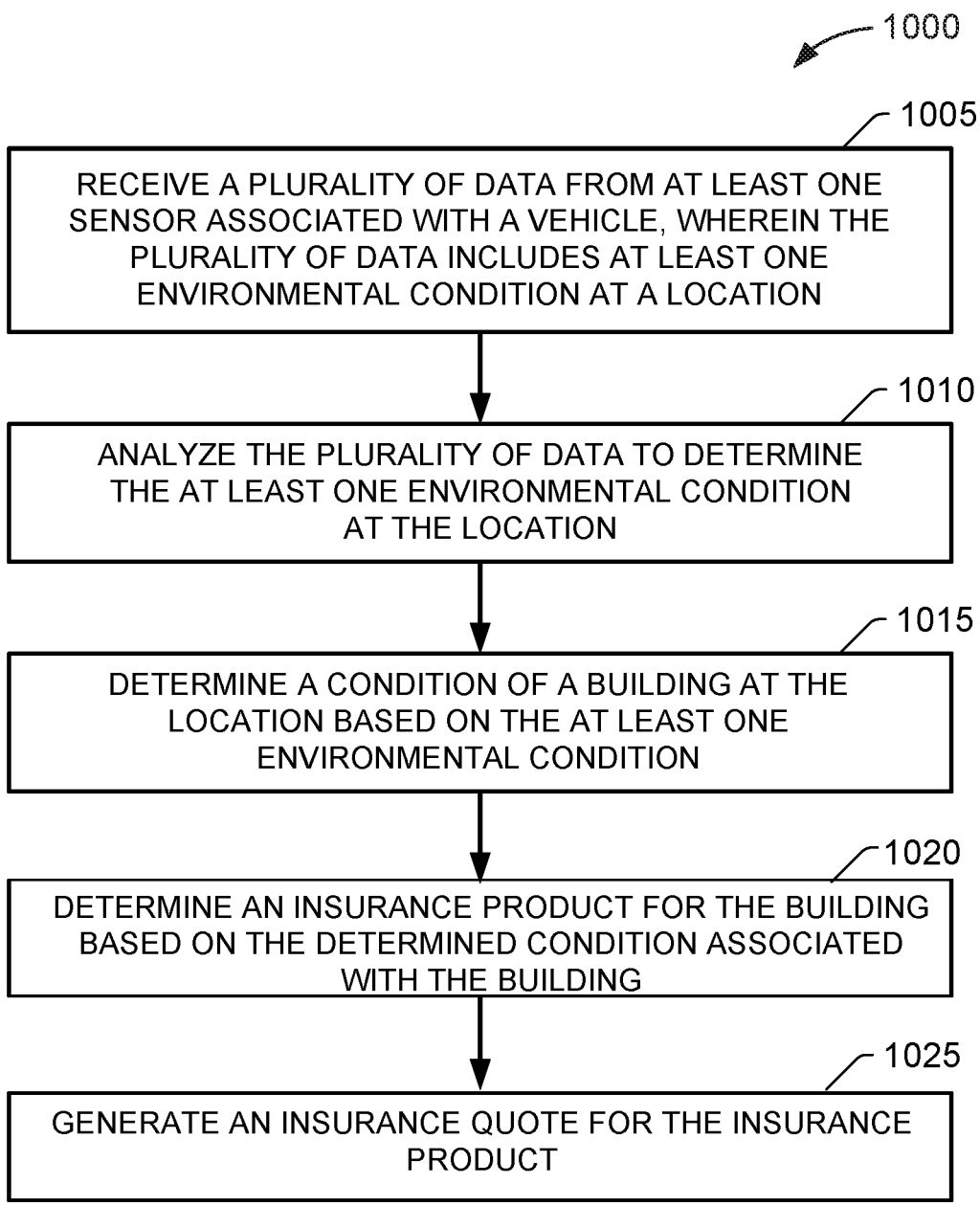
FIG. 10 illustrates a flow chart of a further exemplary computer-implemented process for analyzing the environment of a vehicle shown in FIG. 2.

FIG. 10 illustrates a flow chart of a further exemplary computer-implemented process for analyzing the environment of a vehicle shown in FIG. 2. Process 1000 may be implemented by a computing device, for example EM server 204 (shown in FIG. 2). In the exemplary embodiment, EM server 204 may be in communication with vehicle computer device 110 (shown in FIG. 1) through a wireless communications network, such as a cellular network. In some embodiments, database 202 (shown in FIG. 2) and EM server 204 are both part of vehicle computer device 110 and included in vehicle 100 (shown in FIG. 1).

In the exemplary embodiment, EM server 204 may receive 1005 a plurality of data from at least one sensor 105 (shown in FIG. 1) associated with vehicle 100. In the exemplary embodiment, the plurality of data may include at least one environmental condition. Examples of an environmental condition include, but are not limited to, a condition of a building, a condition of vegetation, a condition of a public thoroughfare, a weather condition, and a vehicular accident that vehicle 100 was not involved in. Other examples of environmental conditions are listed above. In the exemplary embodiment, vehicle 100 includes a plurality of sensors 105 that provide data to vehicle controller 110. Vehicle controller 110 transmits the sensor data to EM server 204 for analysis.

In the exemplary embodiment, EM server 204 may analyze 1010 the plurality of data to determine the at least one environmental condition. In some embodiments, EM server 204 may compare the received plurality of data to historical sensor data to determine the environmental condition. In other embodiments, EM server 204 may use algorithms of potential issues and known examples of environmental conditions to determine if one of the known examples is in the received sensor data.

In the exemplary embodiment, EM server 204 may determine 1015 a condition of a building based upon the at least one environmental condition. For instance, features and status of the building may be determined from processor analysis (such as performing pattern recognition or machine learning techniques on image data), and risk, or lack thereof, may be assessed or estimated by the processor or EM server 204. Using the GPS location information, EM server 204 may determine the address of the building being imaged.

EM server 204 may determine 1020 an insurance product for the building based upon the determine condition of the building. For example, if the building is a home, then EM server 204 may determine 1020 a homeowner's insurance policy for the home based upon the condition of the home. EM server 204 may use the determined address to determine additional information that may be used in determining 1020 an insurance product.

EM server 204 may then generate 1025 an insurance quote for the insurance product. In the exemplary embodiment, EM server 204 transmits the insurance quote and the determined product to a 3$^{rd}$ Party Provider 206 (shown in FIG. 2), such as an insurance provider. In other embodiments, EM server 204 may transmit the insurance quote to the homeowner. The insurance provider may then provide the quote to the homeowner. The insurance quote and/or determined insurance product may include the environmental condition, sensor data, and/or any other information required and/or requested by 3$^{rd}$ Party 206. In some embodiments, EM server 204 may collect sensor data from a plurality of vehicles 100 and use that sensor data to determine 315 a plurality of actionable items.

In some embodiments, EM server 204 may determine at least one actionable item based upon the determined at least one environmental condition. EM server 204 may then adjust the insurance quote based upon the at least one actionable item.

Exemplary Embodiments & Functionality

In one aspect, a computer system for analyzing the environment of a vehicle may be provided. The computer system may include at least one processor in communication with at least one memory device. The at least one processor (local or remote to the vehicle) may be configured or programmed to: (1) receive a plurality of data from at least one sensor associated with a vehicle (such as via wireless communication or data transmission over one or more radio links or communication channels), where the plurality of data includes at least one environmental condition; (2) analyze the plurality of data to determine the at least one environmental condition; (3) determine at least one actionable item based upon the at least one environmental condition; (4) determine at least one provider based upon the actionable item; and/or (5) transmit a message to the at least one provider (such as via wireless communication or data transmission over one or more radio links or wireless communication channels), wherein the message includes the at least one actionable item.

The environmental condition may be proximate to the vehicle at a point in time. The computer system may achieve the above results where the environmental condition is proximate to the vehicle at a plurality of separate points in time and the computer system determines the at least one environmental condition by comparing data associated with the plurality of separate points in time. The environmental condition may be, but is not limited to, a condition of a building, a condition of vegetation, a condition of a public thoroughfare, a weather condition, and a vehicular collision that the vehicle was not involved in.

A further enhancement may be where the plurality of data includes location data, such as from a GPS unit. And the processor may determine a location associated with the at least one environmental condition based upon the plurality data including the location data.

A further enhancement may be where the computer system may transmit a message to one or more emergency services based upon the scenario model. The one or more emergency services may include, but are not limited to, a towing service, an emergency medical service provider, a fire department, a police department, and/or some other emergency responder. The computer system may select the one or more emergency services to transmit to based upon the scenario model and the location of the vehicular crash.

The computer system may achieve the above results by storing a database of historical sensor data based upon past sensor data that the vehicle observed. The computer system may then compare the database of historical sensor data to the received sensor data and determine the at least one environmental condition based upon the comparison. The computer system may also achieve the above results by storing a database of historical data from a plurality of vehicles and using that database to determine the at least one environmental condition. A further enhancement may be where the computer system may be configured to include a database of potential environmental conditions that may be compared to the received sensor data to determine the at least one environmental condition.

The sensor data described herein may include, but is not limited to, pictures and/or images of around the vehicle, 3D scans of the environment around the vehicle, infrared images, the velocity of the vehicle, vibrational data, travel timing data, the acceleration of the vehicle, the location of the vehicle, the direction of travel of the vehicle, one or more changes in velocity, one or more changes in direction of the vehicle, a number of occupants in the vehicle, seatbelt sensor data, and seat occupant weight sensor data.

A further enhancement may be where third parties have signed up with user accounts that are tied to locations. When the computer system detects an environmental condition at a location associated with a user account, the computer system may transmit a message to the corresponding third party about the environmental condition. A still further enhancement may be where the environmental condition is associated with a potential business opportunity and the third party transmits an advertisement associated with the environmental condition and/or the actionable item. The actionable item may be a product or service that the third party may provide to resolve the actionable item.

Machine Learning & Other Matters

The computer-implemented methods discussed herein may include additional, less, or alternate actions, including those discussed elsewhere herein. The methods may be implemented via one or more local or remote processors, transceivers, and/or sensors (such as processors, transceivers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, mobile device, vehicle telematics, autonomous vehicle, and/or intelligent home telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the mobile device or vehicle from device details, mobile device sensors, geolocation information, image data, and/or other data.

In one embodiment, a processing element may be trained by providing it with a large sample of phone and/or online credentials with known characteristics or features. Such information may include, for example, fingerprint, device print, verification codes, PBQA, and/or passive voice analysis.

Based upon these analyses, the processing element may learn how to identify characteristics and patterns that may then be applied to analyzing sensor data, authentication data, image data, mobile device data, and/or other data. For example, the processing element may learn, with the user's permission or affirmative consent, to identify the user based upon the user's device or login information. The processing element may also learn how to identify different types of environmental changes and associated actionable items based upon differences in the received sensor data. The processing element may further learn how to identify an environmental change and/or actionable item based upon partial or incomplete information and determine a level of certainty that the environmental change and/or actionable item is correct.

Additional Exemplary Embodiments

In still another aspect, a computer system for detecting a vehicular crash may be provided. The computer system may include at least one processor, sensor, and/or transceiver in communication with at least one memory device, the at least one processor, sensor, and/or transceiver. The at least one processor may be programmed to (1) receive data from the at least one sensor; (2) determine that a potential vehicular crash is imminent based upon the received data; and/or (3) perform at least one action to reduce a severity of the potential vehicular crash prior to impact. The computer system may include additional, less, or alternate functionality, including that discussed elsewhere herein.

For instance, the data from the at least one sensor may include speed, acceleration, and braking information; and/or image data associated with an area forward of a direction of travel of a vehicle that is acquired by a video recorder or camera mounted on the vehicle. Determining that a potential vehicular crash is imminent may be based upon applying object recognition techniques on the image data acquired by the video recorder or camera mounted on the vehicle. Determining that a potential vehicular crash is imminent may further be based upon vehicle speed, acceleration, and breaking data. Determining that a potential vehicular crash is imminent may be based upon processor analysis of vehicle speed and acceleration data, and the image data acquired by a vehicle mounted video recorder or camera.

The processor may generate a model of the potential vehicular crash based upon the received data to further analyze. The processor may also determine a position and a direction of facing of at least one occupant of the vehicle and use the model to determine an advantageous direction of facing for the at least one occupant. If one of the occupants is not facing in an advantageous way, the processor may generate a sound through the audio system to cause the at least one occupant to change to the advantageous direction of facing.

The processor may also use the model to determine a position or orientation of the vehicle to reduce damage to at least one of one or more occupants of the vehicle and the vehicle itself. The processor may then instruct the vehicle to adjust position to the determined position. This may be done by instructing the vehicle to turn at least one wheel to adjust position and/or instructing the vehicle to raise or lower at least a portion of the vehicle. The processor may also instruct the vehicle to inflate a portion of the vehicle to redirect or lessen the impact.

Determining that a potential vehicular crash is imminent may be based upon processor analysis of vehicle speed and acceleration data, and analysis of the image data acquired by a vehicle mounted video recorder or camera that determines whether an object in a direction of travel of the vehicle is within a predetermined or threshold distance for the given vehicle speed and acceleration.

The sensor data may be analyzed to estimate a severity of the expected vehicular crash, and the estimated severity of the expected vehicular crash may be transmitted to a remote server via wireless communication or data transmission over one or more radio links or wireless communication channels.

The estimated severity of the expected vehicular crash may be determined based upon vehicle speed, acceleration, and braking data acquired from mobile device-mounted sensors and/or vehicle-mounted sensors, and a size and type of the object determined to be in the direction of travel of the vehicle from performing object recognition techniques on the image data captured by one or more vehicle-mounted cameras or video recorders. The type of the object determined to be in the direction of travel of the vehicle may be a compact vehicle, sport-utility vehicle, truck, or semi-truck. The type of the object determined to be in the direction of travel of the vehicle may be a concrete pillar or support, a street sign, traffic light, or other road marking. The type of the object determined to be in the direction of travel of the vehicle may be an animal or a tree.

For instance, the sensor data may include vehicle speed, acceleration, and braking information. The sensor data may further include image data of area in a direction of vehicle travel or otherwise forward of the moving vehicle, the image data being acquired from one or more video recorders or cameras mounted on the vehicle, a dashboard of the vehicle, or a mobile device traveling within the vehicle.

The method may include analyzing, via the one or more processors, the image data using object recognition or pattern recognition techniques to identify objects forward of the moving vehicle. The method may include using the results of the object recognition or pattern recognition techniques performed on the image data to identify type of objects forward of the moving vehicle. The object forward of the moving vehicle identified may be a compact vehicle, sport utility vehicle, or a truck. The object forward of the moving vehicle identified may be a concrete pillar or support, a road sign, a traffic light, or mile marker. The object forward of the moving vehicle identified may be an animal or a tree.

Determining, via the one or more processors, that a vehicle collision is imminent (or likely imminent) based upon analysis of the sensor data may include processor analysis of vehicle speed and acceleration data, and determining whether or not an object shown in image data is within a predetermined distance of the vehicle. The one or more processors may determine that based upon the sensor data (such as vehicle speed, acceleration, and braking) and distance to an object shown in the image data that a collision will occur in 0.5 seconds, 1 second, 2 seconds, 3 seconds, etc. For instance, a processor may determine that a vehicle collision is imminent if it is likely to occur within 1-3 seconds.

Determining, via the one or more processors, an estimated severity of the vehicle collision based upon analysis of the sensor data may include processor analysis of vehicle speed and acceleration data, and determining a size and type of an object shown in image data forward of a direction of travel of the vehicle.

Determining, via the one or more processors, an estimated severity of the vehicle collision based upon analysis of the sensor data may include processor analysis of vehicle speed and acceleration data, and determining a size and type of an object shown in image data forward of a direction of travel of the vehicle, and a distance to the object. Determining, via the one or more processors, whether the estimated severity is above a predetermined threshold may include estimating an amount of vehicle damage from the vehicle collision and estimating whether or not the vehicle will be drivable or not.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAIVI) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A computer system for analyzing the environment of a vehicle, the computer system including at least one processor in communication with at least one memory device, the at least one processor is programmed to:
   receive a plurality of data from a plurality of sensors associated with a plurality of vehicles, wherein the plurality of data includes at least one environmental condition at a location, wherein each sensor of the plurality of sensors receives the plurality of data while the corresponding vehicle travels past the location at a plurality of separate points in time;
   analyze the plurality of data to determine the at least one environmental condition at the location;
   determine a condition of a building at the location based upon the at least one environmental condition;
   determine an insurance product for the building based upon the determined condition associated with the building; and
   generate an insurance quote for the insurance product.

2. The computer system of claim 1, wherein the processor is further programmed to transmit the insurance quote to an insurance provider.

3. The computer system of claim 1, wherein the processor is further programmed to transmit the insurance quote to a user associated with the location.

4. The computer system of claim 1, wherein the processor is further programmed to determine the location associated with the at least one environmental condition based upon the plurality of data.

5. The computer system of claim 4, wherein the at least one processor is further programmed to determine an address based upon the determined location.

6. The computer system of claim 1, wherein the building is a house and the insurance product is home owner's insurance.

7. The computer system of claim 1, wherein the at least one processor is further programmed to:
   determine at least one actionable item based upon the ate least one environmental conditions; and
   adjust the insurance quote based upon the at least one actionable item.

8. The computer system of claim 1, wherein the environmental condition includes at least one of a condition of a building, a condition of vegetation, a condition of a public thoroughfare, and a weather condition.

9. The computer system of claim 1, wherein the processor is further configured to:
   store a plurality of historical sensor data; and
   compare to the historical data to determine the at least one environmental condition.

10. A computer-based method for analyzing the environment of a vehicle, the method implemented on an environment monitoring ("EM") server including at least one processor in communication with at least one memory device, the method comprising:
    receiving, at the EM server, a plurality of data from a plurality of sensors associated with a plurality of vehicles, wherein the plurality of data includes at least one environmental condition at a location, wherein each sensor of the plurality of sensors receives the plurality of data while the corresponding vehicle travels past the location at a plurality of separate points in time;
    analyzing, by the EM server, the plurality of data to determine the at least one environmental condition at the location;
    determining, by the EM server, a condition of a building at the location based upon the at least one environmental condition;
    determining, by the EM server, an insurance product for the building based upon the determined condition associated with the building; and
    generating an insurance quote for the insurance product.

11. The method of claim 10 further comprising transmitting the insurance quote to an insurance provider.

12. The method of claim 10 further comprising transmitting the insurance quote to a user associated with the location.

13. The method of claim 10 further comprising determining the location associated with the at least one environmental condition based upon the plurality of data.

14. The method of claim 13 further comprising determining an address based upon the determined location.

15. The method of claim 10, wherein the building is a house and the insurance product is home owner's insurance.

16. The method of claim 10 further comprising:
    determining at least one actionable item based upon the ate least one environmental conditions; and
    adjusting the insurance quote based upon the at least one actionable item.

17. The method of claim 10, wherein the environmental condition includes at least one of a condition of a building, a condition of vegetation, a condition of a public thoroughfare, and a weather condition.

18. The method of claim 10 further comprising:
    storing a plurality of historical sensor data; and
    comparing to the historical data to determine the at least one environmental condition.

19. At least one non-transitory computer-readable storage media having computer-executable instructions embodied thereon, wherein when executed by at least one processor, the computer-executable instructions cause the processor to:
    receive a plurality of data from a plurality of sensors associated with a plurality of vehicles, wherein the plurality of data includes at least one environmental condition at a location, wherein each sensor of the plurality of sensors receives the plurality of data while the corresponding vehicle travels past the location at a plurality of separate points in time;
    analyze the plurality of data to determine the at least one environmental condition at the location;
    determine a condition of a building at the location based upon the at least one environmental condition;
    determine an insurance product for the building based upon the determined condition associated with the building; and
    generate an insurance quote for the insurance product.

20. The computer-readable storage media of claim 19, wherein the computer-executable instructions further cause the processor to transmit the insurance quote to an insurance provider.

* * * * *